US010153473B2

(12) United States Patent
Miyazawa et al.

(10) Patent No.: US 10,153,473 B2
(45) Date of Patent: Dec. 11, 2018

(54) SEPARATOR FOR ELECTRICITY STORAGE DEVICE, LAMINATE AND POROUS FILM

(71) Applicant: Asahi Kasei E-materials Corporation, Tokyo (JP)

(72) Inventors: Hiroshi Miyazawa, Tokyo (JP); Keitaro Ameyama, Tokyo (JP); Takashi Shuto, Tokyo (JP)

(73) Assignee: Asahi Kasei E-materials Corporation, Tokyo (JP)

( * ) Notice: Subject to any disclaimer, the term of this patent is extended or adjusted under 35 U.S.C. 154(b) by 536 days.

(21) Appl. No.: 14/416,735

(22) PCT Filed: Jul. 26, 2013

(86) PCT No.: PCT/JP2013/070374
§ 371 (c)(1),
(2) Date: Jan. 23, 2015

(87) PCT Pub. No.: WO2014/017651
PCT Pub. Date: Jan. 30, 2014

(65) Prior Publication Data
US 2015/0188108 A1 Jul. 2, 2015

(30) Foreign Application Priority Data

Jul. 26, 2012 (JP) .................................. 2012-166179
Oct. 24, 2012 (JP) .................................. 2012-234852

(51) Int. Cl.
H01M 2/16 (2006.01)
H01M 2/14 (2006.01)
B32B 37/18 (2006.01)
H01G 11/52 (2013.01)

(52) U.S. Cl.
CPC ......... *H01M 2/1686* (2013.01); *B32B 37/182* (2013.01); *H01G 11/52* (2013.01); *H01M 2/1653* (2013.01); *B32B 2457/10* (2013.01); *Y02E 60/13* (2013.01); *Y10T 156/10* (2015.01)

(58) Field of Classification Search
CPC .... H01M 2/16; H01M 2/1653; H01M 2/1686; H01M 2/14; H01M 2/145; B32B 37/18; B32B 37/182
See application file for complete search history.

(56) References Cited

U.S. PATENT DOCUMENTS

| 5,091,272 | A | 2/1992 | Treger |
| 6,465,125 | B1 | 10/2002 | Norio et al. |
| 2002/0187401 | A1 | 12/2002 | Lee et al. |
| 2004/0101757 | A1 | 5/2004 | Kii et al. |
| 2005/0014063 | A1 | 1/2005 | Shi et al. |
| 2005/0186479 | A1 | 8/2005 | Totsuka et al. |
| 2007/0072069 | A1 | 3/2007 | Yamada et al. |
| 2007/0072083 | A1 | 3/2007 | Ikuta et al. |
| 2007/0184340 | A1 | 8/2007 | Ichikawa et al. |
| 2009/0142657 | A1* | 6/2009 | Yen ...................... H01M 2/1653 429/145 |
| 2012/0189897 | A1* | 7/2012 | Wakizaka ............. H01M 2/145 429/144 |
| 2014/0227603 | A1 | 8/2014 | Ogata |
| 2015/0333308 | A1 | 11/2015 | Toyoda et al. |

FOREIGN PATENT DOCUMENTS

| CN | 101218696 A | 7/2008 |
| CN | 103828114 A | 5/2014 |
| EP | 2 261 275 A1 | 12/2010 |
| EP | 2485302 A | 8/2012 |
| JP | 2000-251944 A | 9/2000 |
| JP | 2004-506542 A | 3/2004 |
| JP | 2004-281208 A | 10/2004 |
| JP | 2005-038854 A | 2/2005 |
| JP | 2005-174792 A | 6/2005 |
| JP | 2006-155914 A | 6/2006 |
| JP | 2007-035544 A | 2/2007 |
| JP | 2007-059271 A | 3/2007 |
| JP | 2011-054502 A | 3/2011 |
| JP | 2011-216376 A | 10/2011 |
| KR | 2006-0002959 A | 1/2006 |
| KR | 2006-0042119 A | 5/2006 |
| WO | 2003-012896 A1 | 2/2003 |
| WO | 2005/049318 A1 | 6/2005 |
| WO | 2008/097013 A1 | 8/2008 |
| WO | 2010-135401 A1 | 11/2010 |
| WO | 2011-040562 A1 | 4/2011 |
| WO | 2013/066012 A1 | 5/2013 |
| WO | 2013-151144 A | 10/2013 |

OTHER PUBLICATIONS

International Search Report for corresponding Japanese PCT/JP2013/070374 dated Sep. 10, 2013 and English translation of same.
International Preliminary Report on Patentability in corresponding Japanese PCT/JP2013/070374 dated Jan. 27, 2015.
Supplemental European Search Report issued in corresponding European Patent Application No. 13823038.8 dated Aug. 27, 2015.
Extended European Search Report issued in corresponding European Patent Application No. 16157660.8 dated May 6, 2016.

* cited by examiner

Primary Examiner — Karie O'Neill Apicella
(74) Attorney, Agent, or Firm — Morgan, Lewis & Bockius LLP

(57) ABSTRACT

An object is to provide a separator excellent in adhesiveness to electrodes and a separator for an electricity storage device also excellent in handling performance. A separator for an electricity storage device having a polyolefin microporous film and a thermoplastic polymer coating layer covering at least a part of at least one of surfaces of the polyolefin microporous film, in which the thermoplastic polymer coating layer, on the polyolefin microporous film, has a portion containing a thermoplastic polymer and a portion not containing the thermoplastic polymer in a sea-island configuration, the thermoplastic polymer coating layer contains the thermoplastic polymer having at least two glass-transition temperatures, at least one of the glass-transition temperatures is in a range of less than 20° C. and at least one of the glass-transition temperatures is in a range of 20° C. or more.

12 Claims, No Drawings

SEPARATOR FOR ELECTRICITY STORAGE DEVICE, LAMINATE AND POROUS FILM

TECHNICAL FIELD

The present invention relates to a separator for an electricity storage device, a laminate and a porous film.

BACKGROUND ART

Recently, development of non-aqueous electrolyte batteries, mainly lithium ion batteries, has been aggressively made. Generally, in non-aqueous electrolyte batteries, a microporous film (separator) is provided between positive and negative electrodes. The separator functions to prevent direct contact between the positive and negative electrodes and passes ions through an electrolytic solution held in micropores.

In order to improve cycle characteristics and safety of a non-aqueous electrolyte battery, improvement of a separator has been considered. For example, Patent Literature 1 proposes an adhesive porous film, which is produced by applying a reactive polymer onto a porous film followed by drying, in order to provide a secondary battery having excellent electric discharge characteristics and safety.

Recently, in accordance with reduction in size and thickness of portable appliances, it has been required that electricity storage devices such as a lithium ion secondary battery reduce in size and thickness. In contrast, in order for portable appliances to be able to carry for a long time, increasing capacity of the batteries by improving volume energy density has been attempted.

Then, it is required that a separator is improved in adhesiveness to electrodes in view of not only conventional issues on safety performance, such as characteristics (fuse characteristics) of terminating a battery reaction immediately upon the occurrence of abnormal heating, and performance (short circuit characteristics) of maintaining the shape of the battery even if temperature is elevated to prevent a dangerous situation where a positive-electrode material directly reacts with a negative-electrode material, but also uniformity of charge-discharge current and suppression of lithium dendrite precipitation.

Nonuniform charge-discharge current and precipitation of lithium dendrite rarely occur by improving adhesiveness between a separator and battery electrodes, with the result that the charge-discharge cycle life can be extended.

Under the circumstances, to provide adhesiveness to a separator, an attempt to apply an adhesive polymer to a polyolefin microporous film has been made (see, for example, Patent Literatures 1 and 2).

CITATION LIST

Patent Literature

Patent Literature 1: Japanese Patent Laid-Open No. 2007-59271
Patent Literature 2: Japanese Patent Laid-Open No. 2011-54502

SUMMARY OF INVENTION

Technical Problem

The separator of Patent Literature 1, however, has a problem in that adhesiveness between a reactive polymer and a porous film is not sufficient and accordingly adhesiveness to electrodes is insufficient. The separator has another problem in that if the glass-transition temperature (Tg) of the reactive polymer is decreased in order to improve adhesiveness between the reactive polymer and the porous film, the outermost surface of the separator becomes sticky and handling performance decreases.

In both of the microporous films described in Patent Literatures 1 and 2, there is still room for improvement in view of handling performance and adhesiveness in rolling up electrodes, etc. for forming a battery, and lithium ion permeability.

A first embodiment of the present invention was made in view of the aforementioned problems and is directed to provide a separator excellent in adhesiveness to electrodes and a separator for an electricity storage device also excellent in handling performance.

A second embodiment of the present invention was made in view of the aforementioned problems and is directed to provide a porous film excellent in handling performance at the time of rolling and excellent in rate characteristics of an electricity storage device when the porous film is used as the separator for the electricity storage device, and provide a separator for an electricity storage device formed of the porous film and an electricity storage device using the separator. Another object is to provide a porous film excellent in adhesiveness between a thermoplastic polymer and a polyolefin microporous film and permeability, a separator for an electricity storage device formed of the porous film and an electricity storage device using the separator.

Solution to Problem

The present inventors conducted intensive studies with a view to attaining the above objects. As a result, they found that the problems can be overcome by providing a thermoplastic polymer having predetermined thermal characteristics on at least a part of at least one of the surfaces of a polyolefin microporous film.

More specifically, the present invention is as follows.

[1] A separator for an electricity storage device comprising a polyolefin microporous film and a thermoplastic polymer coating layer covering at least a part of at least one of surfaces of the polyolefin microporous film, wherein the thermoplastic polymer coating layer, on the polyolefin microporous film, has a portion containing a thermoplastic polymer and a portion not containing the thermoplastic polymer in a sea-island configuration, the thermoplastic polymer coating layer contains the thermoplastic polymer having at least two glass-transition temperatures, at least one of the glass-transition temperatures is in a range of less than 20° C., and at least one of the glass-transition temperatures is in a range of 20° C. or more.

[2] The separator for the electricity storage device according to the above [1] or [2], wherein, in the thermoplastic polymer coating layer, a thermoplastic resin having a glass-transition temperature of 20° C. or more is present on a side of a outermost surface of the separator for the electricity storage device, and a thermoplastic resin having a glass-transition temperature of less than 20° C. is present on a side of a interface between the polyolefin microporous film and the thermoplastic polymer coating layer.

[3] The separator for the electricity storage device according to the above [1] or [2], wherein a peel strength of an aluminum foil after the aluminum foil is pressed at a temperature of 25° C. and a pressure of 5 MPa for 3 minutes against the outermost surface of the separator for the electricity storage device having the thermoplastic polymer coating layer thereon is 8 gf/cm or less.

[4] The separator for the electricity storage device according to any one of the above [1] to [3], wherein a peel strength of an aluminum foil after the aluminum foil is pressed at a temperature of 80° C. and a pressure of 10 MPa for 3 minutes against the outermost surface of the separator for the electricity storage device having the thermoplastic polymer coating layer thereon is 30 gf/cm or more.

[5] The separator for the electricity storage device according to any one of the above [1] to [4], wherein a 90° peel strength of the polyolefin microporous film and the thermoplastic polymer coating layer is 6 gf/mm or more.

[6] The separator for the electricity storage device according to any one of the above [1] to [5], wherein, in the thermoplastic polymer coating layer, at least a part of the thermoplastic polymer present on the outermost surface of the separator for the electricity storage device is a particulate thermoplastic polymer.

[7] The separator for the electricity storage device according to the above [6], wherein the particulate thermoplastic polymer has an average particle size of 0.01 μm to 0.4 μm.

[8] The separator for the electricity storage device according to any one of the above [1] to [7], wherein an area ratio of the polyolefin microporous film covered with the thermoplastic polymer coating layer based on 100% of a total area of the polyolefin microporous film is 95% or less based on 100% of the total area of the polyolefin microporous film.

[9] The separator for the electricity storage device according to any one of the above [1] to [8], wherein the area ratio of the polyolefin microporous film covered with the thermoplastic polymer coating layer is 50% or less based on 100% of the total area of the polyolefin microporous film.

[10] A laminate formed by laminating the separator for the electricity storage device according to any one of the above [1] to [9] and electrodes.

[11] A porous film having a polyolefin microporous film and a thermoplastic polymer coating layer covering at least a part of at least one of surfaces of the polyolefin microporous film, wherein the thermoplastic polymer coating layer contains a thermoplastic polymer having a glass-transition temperature in a range of −10° C. or more and 40° C. or less, and a degree of swelling of the thermoplastic polymer with an electrolytic solution of 5 times or less.

[12] The porous film according to the above [11], wherein the thermoplastic polymer coating layer has an average thickness of 1.5 μm or less.

[13] The porous film according to the above [11] or [12], wherein an area ratio of the polyolefin microporous film coated with the thermoplastic polymer coating layer is 70% or less based on 100% of a total area of the polyolefin microporous film.

[14] The porous film according to any one of the above [11] to [13], wherein the thermoplastic polymer has a gel fraction of 90% or more.

[15] The porous film according to any one of the above [11] to [14], wherein the thermoplastic polymer coating layer, formed on the polyolefin microporous film, has a portion containing the thermoplastic polymer and a portion not containing the thermoplastic polymer in a sea-island configuration, and the portion containing the thermoplastic polymer is formed in a dot pattern.

[16] The porous film according to the above [15], wherein the dot has an average major axis of 20 to 1000 μm.

Advantageous Effects of Invention

According to the first embodiment of the present invention, it is possible to provide a separator excellent in adhesiveness to electrodes and a separator for an electricity storage device also excellent in handling performance.

According to the second embodiment of the present invention, it is possible to provide a porous film excellent in handling performance at the time of rolling and excellent in rate characteristics of an electricity storage device when the porous film is used as the separator for the electricity storage device, a separator for an electricity storage device formed of the porous film and an electricity storage device using the separator. It is also possible to provide a porous film excellent in adhesiveness between a thermoplastic polymer and a polyolefin microporous film and permeability, a separator for an electricity storage device formed of the porous film and an electricity storage device using the separator.

DESCRIPTION OF EMBODIMENTS

Now, embodiments (hereinafter each referred to as "the present embodiment") for carrying out the present invention will be more specifically described below. Note that the present invention is not limited to the following embodiments and can be modified in various ways within the range of the gist and carried out.

[First Embodiment]
[Separator for Electricity Storage Device]

The separator for the electricity storage device (hereinafter also referred to simply as the "separator") according to the present embodiment has a polyolefin microporous film (hereinafter also referred to simply as "the microporous film") and a thermoplastic polymer coating layer covering at least a part of at least one of surfaces of the polyolefin microporous film, in which the thermoplastic polymer coating layer, on the polyolefin microporous film, has a portion containing a thermoplastic polymer and a portion not containing the thermoplastic polymer in a sea-island configuration, the thermoplastic polymer coating layer contains the thermoplastic polymer having at least two glass-transition temperatures, at least one of the glass-transition temperatures is in a range of less than 20° C. and at least one of the glass-transition temperatures is in a range of 20° C. or more.

[Thermoplastic Polymer Coating Layer]

The separator for the electricity storage device according to the present embodiment has a thermoplastic polymer coating layer covering at least a part of at least one of the surfaces of the polyolefin microporous film.

The thermoplastic polymer coating layer contains the thermoplastic polymer having at least two glass-transition temperatures. At least one of the glass-transition temperatures of the thermoplastic polymer is in a range of less than 20° C. and at least one of the glass-transition temperatures is in a range of 20° C. or more.

[Thermoplastic Polymer]

Examples of the thermoplastic polymer to be used in the present embodiment, include, but not particularly limited to, polyolefin resins such as polyethylene and polypropylene and α-polyolefin; fluorine-containing resins such as polyvinylidene fluoride and polytetrafluoroethylene and copolymers containing these; diene polymers containing a conjugated diene such as butadiene and isoprene as a monomer unit or copolymers containing these and hydrides of these; acrylic polymers containing e.g., an acrylate and a methacrylate as a monomer unit or copolymer containing these and hydrides of these; rubbers such as an ethylene propylene rubber, a polyvinyl alcohol, and a polyvinyl acetate; cellulose derivatives such as ethyl cellulose, methyl cellulose, hydroxyethyl cellulose and carboxymethylcellulose; and resins having a melting point and/or glass-transition temperature of 180° C. or more, such as polyphenylene ether, polysulfone, polyethersulfone, polyphenylene sulfide, polyetherimide, polyamideimide, polyamide and polyester and mixtures of these. Examples of the monomers that can be used for synthesizing a thermoplastic polymer include a monomer having a hydroxyl group and a sulfonic acid group, a carboxyl group, an amide group or a cyano group.

Among these thermoplastic polymers, a diene polymer, an acrylic polymer or a fluorine polymer is preferred since it has excellent binding property to an electrode active material, strength and flexibility.

(Diene Polymer)

The diene polymer, which is not particularly limited, is, for example, a polymer containing a monomer unit obtained by polymerizing a conjugated diene having conjugated two double bonds, such as butadiene and isoprene. Examples of the conjugated diene monomer include, but not particularly limited to, 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene and 3-butyl-1,3-octadiene. These may be polymerized singly or copolymerized.

The ratio of the monomer unit obtained by polymerizing a conjugated diene in a diene polymer, which is not particularly limited to, is, for example, 40 mass % or more, preferably 50 mass % or more and more preferably 60 mass % or more of the whole diene polymer.

Examples of the above diene polymer include, but not particularly limited to, homopolymers of a conjugated diene such as polybutadiene and polyisoprene, and copolymers of a conjugated diene and a copolymerizable monomer. Examples of the copolymerizable monomer may include, but not particularly limited to, (meth)acrylate monomers (described later) and the following monomers (hereinafter also referred to as "other monomers").

Examples of the "other monomers" include, but not particularly limited to, α,β-unsaturated nitrile compounds such as acrylonitrile and methacrylonitrile; unsaturated carboxylic acids such as acrylic acid, methacrylic acid, itaconic acid and fumaric acid; styrene monomers such as styrene, chlorostyrene, vinyl toluene, t-butyl styrene, vinyl benzoate, methylvinyl benzoate, vinylnaphthalene, chloromethylstyrene, hydroxymethylstyrene, α-methylstyrene and divinylbenzene; olefins such as ethylene and propylene; halogen atom-containing monomers such as vinyl chloride and vinylidene chloride; vinyl esters such as vinyl acetate, vinyl propionate, vinyl butyrate and vinyl benzoate; vinyl ethers such as methyl vinyl ether, ethyl vinyl ether and butyl vinyl ether; vinyl ketones such as methyl vinyl ketone, ethyl vinyl ketone, butyl vinyl ketone, hexyl vinyl ketone and isopropenyl vinyl ketone; heterocyclic ring-containing vinyl compounds such as N-vinylpyrrolidone, vinylpyridine and vinyl imidazole; acrylate and/or methacrylate compounds such as methyl acrylate and methyl methacrylate; hydroxyalkyl group-containing compounds such as β-hydroxyethyl acrylate and β-hydroxyethyl methacrylate; and amide monomers such as acrylic amide, N-methylolacrylamide, acrylic amide-2-methylpropane sulfonate. These may be used alone or in combination of two or more.

(Acrylic Polymer)

The acrylic polymer, which is not particularly limited to, is a polymer containing a monomer unit obtained by polymerizing preferably a (meth)acrylate monomer.

Note that, the "(meth) acrylic acid" in the present specification refers to an "acrylic acid or a methacrylic acid" and the "(meth)acrylate" refers to an "acrylate or a methacrylate".

Examples of the (meth)acrylate monomer include, but not particularly limited to, alkyl (meth)acrylates such as methyl (meth)acrylate, ethyl (meth)acrylate, n-propyl (meth)acrylate, isopropyl (meth)acrylate, n-butyl (meth)acrylate, t-butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, decyl (meth) acrylate, lauryl (meth) acrylate, n-tetradecyl (meth) acrylate and stearyl (meth)acrylate; hydroxy group-containing (meth)acrylates such as hydroxyethyl (meth)acrylate, hydroxypropyl (meth)acrylate and hydroxybutyl (meth) acrylate; amino group-containing (meth)acrylates such as aminoethyl (meth)acrylate; and epoxy group-containing (meth)acrylates such as glycidyl (meth) acrylate.

The ratio of the monomer unit obtained by polymerizing a (meth)acrylate monomer, which is not particularly limited, is, for example, 40 mass % or more, preferably 50 mass % or more and more preferably 60 mass % or more of the total acrylic polymer. Examples of the acrylic polymer include a homopolymer of a (meth)acrylate monomer and a copolymer of a (meth)acrylate monomer and a copolymerizable monomer thereof.

Examples of the copolymerizable monomer include "other monomers" mentioned in the above section "diene polymer" and these may be used alone or in combination of two or more.

(Fluorine Polymer)

Examples of the fluorine polymer include, but not particularly limited to, a homopolymer of vinylidene fluoride and a copolymer of vinylidene fluoride and a copolymerizable monomer thereof. The fluorine polymer is preferred in view of electrochemical stability.

The ratio of the monomer unit obtained by polymerizing a vinylidene fluoride, which is not particularly limited to, is, for example, 40 mass % or more, preferably 50 mass % or more and more preferably 60 mass % or more.

Examples of the copolymerizable monomer with vinylidene fluoride include, but not particularly limited to, fluorine-containing ethylenic unsaturated compounds such as vinyl fluoride, tetrafluoroethylene, trifluorochloroethylene, hexafluoropropylene, hexafluoroisobutylene, perfluoroacrylic acid, perfluoromethacrylic acid and a fluoro alkyl ester of an acrylic acid or a methacrylic acid; non-fluorine containing ethylenic unsaturated compounds such as cyclohexylvinyl ether and hydroxyethyl vinyl ether; and non-fluorine containing diene compounds such as butadiene, isoprene and chloroprene.

Of the fluorine polymers, a homopolymer of vinylidene fluoride, a vinylidene fluoride/tetrafluoro ethylene copolymer, and a vinylidene fluoride/tetrafluoroethylene/hexafluoropropylene copolymer, etc. are preferred. A particularly preferable fluorine polymer is a vinylidene fluoride/tetrafluoroethylene/hexafluoropropylene copolymer. The composition of monomers thereof usually consists of 30 to 90 mass % of vinylidene fluoride, 50 to 9 mass % of tetrafluoroethylene and 20 to 1 mass % of hexafluoropropylene. These fluorine resin particles may be used alone or as a mixture of two types or more.

As the monomer to be used for synthesizing the above thermoplastic polymers, a monomer having a hydroxyl group, a carboxyl group, an amino group, a sulfonate group, an amide group or a cyano group can be used.

Examples of the monomer having a hydroxy group include, but not particularly limited to, a vinyl monomer such as pentenol.

Examples of the monomer having a carboxyl group include, but not particularly limited to, an unsaturated carboxylic acid having an ethylenic double bond such as (meth)acrylic acid and itaconic acid, and a vinyl monomer such as pentenoic acid.

Examples of the monomer having an amino group include, but not particularly limited to, 2-aminoethyl methacrylate.

Examples of the monomer having a sulfonic acid group include, but not particularly limited to, vinyl sulfonate, methylvinyl sulfonate, (meth)allyl sulfonate, styrene sulfonate, (meth)acrylic acid-2-ethyl sulfonate, 2-acrylic amide-2-methylpropane sulfonate and 3-aryloxy-2-hydroxypropane sulfonate.

Examples of the monomer having an amide group include, but not particularly limited to, an acrylamide, methacrylamide, N-methylolacrylamide and N-methylol methacrylamide.

Examples of the monomer having a cyano group include, but not particularly limited to, acrylonitrile, methacrylonitrile, α-chloroacrylonitrile and α-cyanoethyl acrylate.

The thermoplastic polymers to be used in the present embodiment may be used alone or as a mixture of two types or more and preferably a mixture of at least two types of polymers.

(Glass-Transition Temperature of Thermoplastic Polymer)

It is characterized in view of adhesiveness between the separator and electrodes in that the thermoplastic polymers to be used in the present embodiment have at least two glass-transition temperatures, at least one of which is in a range of less than 20° C. and at least one of which is in a range of 20° C. or more. The glass-transition temperature herein is determined from a DSC curve obtained by differential scanning calorimetry (DSC). Note that in the present specification, the glass-transition temperature is sometimes represented by Tg.

Specifically, the glass-transition temperature is determined by an intersection of a linear line, which is extended from the base line on a lower temperature side on the DSC curve toward a high temperature side, with a tangent line at a glass-transition inflection point present in a stepwise change portion. More specifically, the method described in Examples can be referred to.

The "glass transition" herein refers to a calorimetric change caused in DSC on the endothermic side in accordance with a change of a polymer (test piece) state. Such a calorimetric change is observed as a stepwise change or a stepwise change in combination with a peak in a DSC curve.

The "stepwise change" is seen in a transit portion of the DSC curve apart from an original base line to a new base line. Note that the stepwise change in combination with a peak is also included.

The "inflection point" refers to a point present in the stepwise change portion of a DSC curve, in which the slope of the DSC curve takes a maximum value. The "inflection point" can be referred to also as a point present in the stepwise change portion at which a convex shaped curve changes to a concave shaped curve.

The "peak" refers to a portion of the DSC curve in which curve line separates from a base line and returns to the base line, again.

The "base line" refers to a DSC curve within a temperature range where no transition and reaction of a test piece occur.

In the present embodiment, at least one of the glass-transition temperatures of the thermoplastic polymer used herein is present in the range of less than 20° C. Owing to this, excellent adhesiveness to a microporous film is obtained, with the result that an effect, i.e., excellent adhesiveness between a separator and electrodes, is exerted. At least one of the glass-transition temperatures of the thermoplastic polymer used herein is preferably present in the range of 15° C. or less and more preferably in the range of −30° C. or more and 15° C. or less.

The glass-transition temperature present in the range of less than 20° C., is preferably present just within the range of −30° C. or more and 15° C. or less, for the reason that adhesiveness between a thermoplastic polymer and a microporous film is improved and satisfactory handling performance is maintained.

In the present embodiment, at least one of the glass-transition temperatures of the thermoplastic polymer used herein is present in the range of 20° C. or more. Owing to this, effects, i.e., excellent adhesiveness between a separator and electrodes and excellent handling performance, are exerted. At least one of the glass-transition temperatures of the thermoplastic polymer used herein is preferably present in the range of 20° C. or more and 120° C. or less and more preferably in the range of 50° C. or more and 120° C. or less. If the glass-transition temperature is present in the above range, satisfactory handling performance can be obtained. In addition, adhesiveness between electrodes and a separator, which is provided by application of pressure in a battery fabrication process, can be improved.

The glass-transition temperature present in the range of 20° C. or more is preferably present just within the range of 20° C. or more and 120° C. or less and more preferably within the range of 50° C. or more and 120° C. or less, for the reason that adhesiveness between a thermoplastic polymer and a microporous film is improved and satisfactory handling performance is maintained.

The thermoplastic polymer having two glass-transition temperatures can be produced by a method of blending at least two types of thermoplastic polymers or a method of using a thermoplastic polymer having a core-shell structure; however, the method for producing such a thermoplastic polymer is not limited to these. The core-shell structure of a polymer refers to a double structure consisting of a core portion and a shell portion, which are formed of different polymers.

Particularly, owing to a polymer blend and the core-shell structure, a polymer of high glass-transition temperature can be used in combination with a polymer of a low glass transition temperature, with the result that the entire glass-transition temperature of the thermoplastic polymers can be controlled. In addition, a plurality of functions can be provided to the entire thermoplastic polymer. To describe it more specifically, in the case of the blend, if at least two types of polymers such as a polymer having a glass-transition temperature in the range of 20° C. or more and a polymer having a glass-transition temperature in the range of less than 20° C. are blended, stickiness resistance and wettability for a polyolefin microporous film can be simultaneously obtained. In the case of blending polymers, the blending ratio of a polymer having a glass-transition temperature in the range of 20° C. or more and a polymer having a glass-transition temperature in the range of less than 20° C. falls within the range of preferably 0.1:99.9 to 99.9:0.1, more preferably 5:95 to 95:5, further preferably 50:50 to 95:5 and still further preferably 60:40 to 90:10. In the case of a core-shell structure, if a shell polymer is varied, adhesiveness to and compatibility with other materials such as a polyolefin microporous film, can be controlled; whereas, if a polymer constituting a core portion is adjusted, a polymer can be adjusted for enhanced adhesiveness to electrodes after e.g., hot press. Furthermore, if a high-viscosity polymer is used in combination with a high-elasticity polymer, viscoelasticity can be controlled.

Note that the glass-transition temperature of the shell of a thermoplastic polymer having a core-shell structure, which is not particularly limited, is preferably less than 20° C., more preferably 15° C. or less and further preferably −30° C. or more and 15° C. or less. The glass-transition temperature of the core of a thermoplastic polymer having a core-shell structure, which is not particularly limited, is preferably 20° C. or more, more preferably 20° C. or more and 120° C. or less and further preferably 50° C. or more and 120° C. or less.

In the present embodiment, the glass-transition temperature, i.e., Tg, of a thermoplastic polymer can be appropriately controlled, for example, by changing the components and the injection ratio of monomers for use in producing the thermoplastic polymer. More specifically, the glass-transition temperature Tg of a thermoplastic polymer can be roughly estimated based on Tg values (generally shown, for example, in "polymer handbook" (A WILEY-INTERSCIENCE PUBLICATION)) of individual monomers (Tg values of homopolymers) for use in producing a thermoplastic polymer and the blending ratio of the monomers. To describe it more specifically, if a copolymer is produced by blending monomers such as styrene, methyl methacrylate and acrylonitrile, which provide a polymer having Tg of about 100° C., in a high ratio, a copolymer having a high Tg value can be obtained. In contrast, if a copolymer is produced by blending monomers such as butadiene, which provides a polymer having Tg of about −80° C., and N-butyl acrylate and 2-ethylhexyl acrylate, which provide a polymer having Tg of about −50° C., in a high ratio, a copolymer having a low Tg value can be obtained.

Furthermore, Tg of the polymer can be roughly calculated in accordance with the FOX formula (the following formula (1)). Note that as the glass-transition temperature of the thermoplastic polymer of the present application, a value measured by a method based on the DSC mentioned above is employed.

$$1/Tg=W1/Tg1+W2/Tg2+\ldots+Wi/Tgi+\ldots Wn/Tgn \quad (1)$$

(in the formula (1), Tg (K) is Tg of a copolymer; Tgi (K) is Tg of each monomer i (homopolymer); and Wi is a mass fraction of each monomer)

(Structure of Thermoplastic Polymer Coating Layer)

In the thermoplastic polymer coating layer, it is preferable that a thermoplastic resin having a glass-transition temperature of 20° C. or more be present on the side of the outermost surface of a separator for an electricity storage device and a thermoplastic resin having a glass-transition temperature of less than 20° C. be present on the side of the interface between a polyolefin microporous film and a thermoplastic polymer coating layer. Note that in the sea-island like thermoplastic polymer coating layer, "the outermost surface" refers to the surface of a sea-island like thermoplastic polymer coating layer in contact with the electrodes when a separator for an electricity storage device and electrodes are laminated. Furthermore, "the interface" refers to the surface of the sea-island like thermoplastic polymer coating layer in contact with the polyolefin microporous film.

In the thermoplastic polymer coating layer, the thermoplastic resin having a glass-transition temperature of 20° C. or more is present on the side of the outermost surface of a separator for an electricity storage device. Owing to this, more excellent adhesiveness to a microporous film is obtained, with the result that adhesiveness of the separator and electrodes tends to be excellent. Furthermore, a thermoplastic resin having a glass-transition temperature of less than 20° C. is present on the side of the interface between the polyolefin microporous film and the thermoplastic polymer coating layer. Owing to this, adhesiveness between the separator and electrodes and handling performance tend to be more excellent.

Due to the presence of such a thermoplastic polymer coating layer, adhesiveness between a separator and electrodes and handling performance tend to be more improved. The above structure can be achieved by satisfying, for example, the following matters: (a) a thermoplastic polymer consists of a particulate thermoplastic polymer and a binder polymer, which allows the particulate thermoplastic polymer to adhere to a polyolefin microporous film in such a state that the particulate thermoplastic polymer is exposed on the surface, and the glass-transition temperature of the particulate thermoplastic polymer is present in the range of 20° C. or more; whereas, a thermoplastic resin having a glass-transition temperature of less than 20° C. is present on the side of the interface between the polyolefin microporous film and the thermoplastic polymer coating layer; and (b) the thermoplastic polymer has a laminate structure, the glass-transition temperature of a thermoplastic polymer serving as the outermost surface layer when used as a separator, is present in the range of 20° C. or more; whereas a thermoplastic resin having a glass-transition temperature of less than 20° C. is present on the side of the interface between the polyolefin microporous film and the thermoplastic polymer coating layer. Note that (b) the thermoplastic polymer may have a laminate structure of polymers having different Tg values.

(Sea-Island Configuration)

The thermoplastic polymer coating layer, on the polyolefin microporous film, has a portion containing the thermoplastic polymer and a portion not containing the thermoplastic polymer in a sea-island configuration. Examples of the shape of islands in sea, which is not particularly limited to, include a linear, dot, grid, stripe and hexagonal patterns. Of them, in view of obtaining permeability and uniform adhesiveness to electrodes, dots are more preferable. Dots indicate that a portion containing a thermoplastic polymer and a portion not containing the thermoplastic polymer are in a sea-island configuration on the polyolefin microporous film. Note that, in the thermoplastic polymer coating layer, a portion containing the thermoplastic polymer may be discretely present like islands, or conversely, present like a continuous plane. In the case of discrete islands, the shape of the islands is not particularly limited to; however, the interval of island dots is preferably 5 μm to 500 μm in order that adhesiveness to electrodes and cycle characteristics are simultaneously obtained. Furthermore, the size of the dots is not particularly limited; however, the average major axis thereof is preferably 10 μm or more and 1000 μm or less, more preferably 20 μm or more and 800 μm or less, and further preferably 50 µm or more and 500 µm or less in order to obtain adhesiveness to electrodes.

The average major axis of dots of the thermoplastic polymer can be controlled by varying the polymer concentration of a coating liquid, the amount of a polymer solution coated, coating method and coating conditions thereof.

(Particulate Thermoplastic Polymer)

In the present embodiment, the structure of a thermoplastic polymer, which is not particularly limited to, is, for example, a single layer structure, a structure consisting of a particulate thermoplastic polymer and a polymer surrounding at least a part of the particulate thermoplastic polymer, and a laminate structure. In the thermoplastic polymer coating layer, at least a part of the thermoplastic polymer present on the outermost surface of a separator for an electricity storage device is preferably a particulate thermoplastic polymer. Owing to the presence of such a structure, more excellent adhesiveness between the separator and electrodes and handling performance of the separator tend to be obtained.

The "particulate" herein refers to the state where individual thermoplastic polymer particles are in discrete forms having a contour when they are observed under a scanning electron microscope (SEM). The forms may be long and thin, spherical or poly-angular, etc.

In the present embodiment, the area ratio of the particulate thermoplastic polymer based on the thermoplastic polymer present on the outermost surface of the separator is not particularly limited to; however, the area ratio is preferably 95% or less and more preferably 50% or more and 95% or less. The area ratio S of the particulate thermoplastic polymer based on the thermoplastic polymer present on the outermost surface of the separator is calculated based on the following formula:

$S$ (%)=area of particulate thermoplastic polymer÷total area of thermoplastic polymer present on the outermost surface of separator where the area of particulate thermoplastic polymer is measured under observation by SEM (magnification: 30000×) of the outermost surface of a separator, as later described in Examples.

(Average Particle Size of Thermoplastic Polymer)

The average particle size of a particulate thermoplastic polymer is preferably 0.01 µm to 1 µm, more preferably 0.05 µm to 0.5 µm and further preferably 0.01 µm to 0.4 µm. If the average particle size falls within the above range, the particles are satisfactorily dispersed in a solution and the concentration, viscosity and the like of the solution for coating can be easily controlled to easily form a uniform packed bed. As a result, adhesiveness to electrodes and cycle characteristics are more improved and the thickness of a coating film can be easily controlled.

(Degree of Swelling of Thermoplastic Polymer with Electrolytic Solution)

In the present embodiment, it is preferable that a thermoplastic polymer be swellable with an electrolytic solution in view of battery characteristics such as cycle characteristics. Provided that the weight of a thermoplastic polymer (A), which is prepared by impregnating a dried thermoplastic polymer (or a thermoplastic polymer dispersion solution) with an electrolytic solution for 3 hours, followed by washing, is represented by Wa, and the weight of (A) obtained after the thermoplastic polymer (A) is allowed to stand still in an oven of 150° C. for one hour is represented by Wb, degree of swelling with the electrolytic solution can be calculated in accordance with the following formula. The degree of swelling is preferably 5 times or less, more preferably 4.5 times or less and further preferably 4 times or less. Furthermore, the degree of swelling is preferably equivalent or more and more preferably twofold or more.

Degree of swelling of thermoplastic polymer with electrolytic solution (times)=(Wa−Wb)÷Wb In the present embodiment, degree of swelling of a thermoplastic polymer with an electrolytic solution can be controlled by varying the types and ratio of monomers to be polymerized.

(Gel Fraction of Thermoplastic Polymer)

In the present embodiment, the gel fraction of thermoplastic polymer is not particularly limited; however, the gel fraction is preferably 80% or more, more preferably 85% or more and further preferably 90% or more in order to suppress dissolution of the thermoplastic polymer in an electrolytic solution and maintain strength of the thermoplastic polymer in a battery. The gel fraction herein can be obtained based on measurement of toluene-insoluble matter as later described in Examples.

The gel fraction can be controlled by varying the types and ratio of monomers to be polymerized and polymerization conditions.

(Content of Thermoplastic Polymer)

In the present embodiment, the content of a thermoplastic polymer, which is not particularly limited, is preferably 0.05 g/m$^2$ or more and 1.0 g/m$^2$ or less in order to improve adhesion force of separator and suppress reduction in cycle characteristics (permeability) caused by clogging of the pores of the polyolefin microporous film. The content is more preferably 0.07 g/m$^2$ or more and 0.8 g/m$^2$ or less and further preferably 0.1 g/m$^2$ or more and 0.7 g/m$^2$ or less.

The content of a thermoplastic polymer can be controlled by varying the polymer concentration of a coating liquid and the amount of polymer solution coated.

(Thickness of Thermoplastic Polymer Coating Layer)

In the present embodiment, the average thickness of a thermoplastic polymer coating layer on one of the surfaces is preferably 1.5 µm or less, more preferably 1.0 µm or less and further preferably 0.5 µm or less. The average thickness of the thermoplastic polymer is preferably 1.5 µm or less. This is because reduction in permeability by the thermoplastic polymer and adhesiveness between thermoplastic polymers or between the thermoplastic polymer and a polyolefin microporous film can be effectively suppressed.

The average thickness of a thermoplastic polymer can be controlled by varying the polymer concentration of a coating liquid, the amount of polymer solution coated, the coating method and coating conditions thereof.

The thickness of a thermoplastic polymer coating layer can be measured by the method described in Examples.

(Area Ratio of Polyolefin Microporous Film Covered with Thermoplastic Polymer Coating Layer)

The separator according to the present embodiment has a thermoplastic polymer in at least a part of at least one of the surfaces of a polyolefin microporous film. The area ratio (%) of the polyolefin microporous film covered with the thermoplastic polymer coating layer is preferably 95% or less, more preferably 70% or less, further preferably 50% or less, further preferably 45% or less, and still further preferably 40% or less based on the total area (100%) of the polyolefin microporous film. Furthermore, the area ratio (%) is preferably 5% or more. If the area ratio is 95% or less, blocking of the pores of a polyolefin microporous film with a thermoplastic polymer can be more suppressed and permeability tends to be more improved. In contrast, if the area ratio is 5% or more, adhesiveness tends to be more improved. The area ratio herein, is calculated by a method later described in Examples.

The area ratio can be controlled by varying the polymer concentration of a coating liquid, the amount of polymer solution coated, the coating method and coating conditions thereof.

[Polyolefin Microporous Film]

In the present embodiment, the polyolefin microporous film, which is not particularly limited to, is, for example, a porous film formed of a polyolefin resin composition containing a polyolefin and preferably a porous film containing a polyolefin resin as a main component. In the polyolefin microporous film of the present embodiment, the content of a polyolefin resin is not particularly limited. In view of shutdown performance in the case where the polyolefin microporous film is used as the separator for the electricity storage device, the porous film is preferably formed of a polyolefin resin composition in which a polyolefin resin has a mass fraction of 50% or more and 100% or less of the total components constituting the porous film. The percentage of a polyolefin resin is preferably 60% or more and 100% or less and more preferably 70% or more and 100% or less.

The polyolefin resin, which is not particularly limited, refers to a polyolefin resin for use in usual extrusion, injection, inflation and blow molding, etc. Examples of the polyolefin resin that can be used include homopolymers, copolymers and multi-step polymerization polymers of ethylene, propylene, 1-butene, 4-methyl-1-pentene, 1-hexene and 1-octene, etc. Polyolefins selected from the group consisting of homopolymers, copolymers and multi-step polymerization polymers can be used alone or as a mixture.

Typical examples of the polyolefin resin include, but not particularly limited to, a low-density polyethylene, a linear low-density polyethylene, a medium-density polyethylene, a high-density polyethylene, an ultrahigh molecular weight polyethylene, an isotactic polypropylene, an atactic polypropylene, an ethylene-propylene random copolymer, a polybutene and an ethylene propylene rubber.

In the case where the separator of the present embodiment is used as a battery separator, in particular, a resin containing a high-density polyethylene as a main component is preferably used since it has a low melting point and high strength.

In order to improve the heat resistance of a porous film, a porous film formed of a resin composition containing a polypropylene and a polyolefin resin except the polypropylene is more preferably used.

The tertiary structure of the polypropylene herein is not limited and any of an isotactic polypropylene, a syndiotactic polypropylene and an atactic polypropylene may be used.

The ratio of a polypropylene based on the total polyolefin in a polyolefin resin composition, which is not particularly limited to, is preferably 1 to 35 mass %, more preferably 3 to 20 mass % and further preferably 4 to 10 mass % in order to simultaneously obtain heat resistance and satisfactory shutdown function.

In this case, examples of the polyolefin resin except the polypropylene, include, but not limited to, an olefin hydrocarbon homopolymer or copolymer such as ethylene, 1-butene, 4-methyl-1-pentene, 1-hexene and 1-octene. Specific examples thereof include polyethylene, polybutene and an ethylene-propylene random copolymer.

In view of shutdown characteristics (pores are blocked by thermofusion), as the polyolefin resin except the polypropylene, a polyethylene such as a low-density polyethylene, a linear low-density polyethylene, a medium-density polyethylene, a high-density polyethylene and an ultrahigh molecular weight polyethylene is preferably used. Among these, in view of strength, a polyethylene having a density of 0.93 g/cm$^3$ or more, which is measured in accordance with JISK7112, is more preferably used.

The viscosity average molecular weight of a polyolefin resin constituting a polyolefin microporous film, which is not particularly limited to, is preferably 30,000 or more and 12,000,000 or less, more preferably 50,000 or more and less than 2,000,000 and further preferably 100,000 or more and less than 1,000,000. The viscosity average molecular weight is preferably 30,000 or more. This is because, if so, the melt tension in a melt-molding process increases and satisfactory moldability is obtained; at the same time, strength tends to increase since polymer chains get tangled. In contrast, the viscosity average molecular weight is preferably 12,000,000 or less. This is because, if so, uniform melt-kneading can be easily made and the resultant sheet tends to has excellent moldability, particularly thickness stability. Furthermore, the viscosity average molecular weight is preferably less than 1,000,000. This is because, if so, pores tend to be easily blocked as temperature increases and satisfactory shutdown function tends to be obtained. Note that in place of solely using a polyolefin having a viscosity average molecular weight of, for example, less than 1,000,000, a mixture of a polyolefin having a viscosity average molecular weight of 2,000,000 and a polyolefin having a viscosity average molecular weight of 270,000 and having a viscosity average molecular weight of less than 1,000,000 may be used.

In the present embodiment, the polyolefin microporous film can contain additives, if necessary. Examples of the additives include, but not particularly limited to, a polymer except a polyolefin; an inorganic particle; an antioxidant such as a phenol based, phosphorus based, and sulfur based antioxidants; a metallic soap such as calcium stearate and zinc stearate; a UV absorber; a light stabilizer; an antistatic agent; an antifog additive; and a color pigment.

The total content of these additives is preferably at most 20 parts by mass, more preferably at most 10 parts by mass and further preferably at most 5 parts by mass based on the polyolefin resin composition (100 parts by mass).

(Physical Properties of Polyolefin Microporous Film)

In the present embodiment, puncture strength of the polyolefin microporous film, which is not particularly limited to, is preferably 200 g/20 μm or more, more preferably 300 g/20 μm or more; and preferably 2000 g/20 μm or less and more preferably 1000 g/20 μm or less. The puncture strength is preferably 200 g/20 μm or more in order to suppress film breakage by e.g., an active material dropped out during rolling up a battery and also to suppress a fear of short-circuit caused by expansion-contraction of an electrode in accordance with electric charge-discharge. In contrast, a puncture strength is preferably 2000 g/20 μm or less because width contraction due to orientational relaxation during heating can be reduced. The puncture strength herein is measured by a method later described in Examples.

Note that the above puncture strength can be controlled by, for example, controlling stretching ratio and stretching temperature.

In the present embodiment, the porosity of a polyolefin microporous film, which is not particularly limited to, is preferably 20% or more and more preferably 35% or more; and preferably 90% or less and more preferably 80% or less. The porosity is preferably 20% or more in order to obtain the permeability of a separator. In contrast, the porosity is preferably 90% or less in order to obtain puncture strength. The porosity herein is measured by a method later described in Examples.

Note that the porosity can be controlled by varying e.g., a stretching ratio.

In the present embodiment, the thickness of a polyolefin microporous film, which is not particularly limited to, is preferably 2 μm or more and more preferably 5 μm or more; and preferably 100 μm or less, more preferably 60 μm or less and further preferably 50 μm or less. The film thickness is preferably 2 μm or more in order to improve machine strength. In contrast, the film thickness is preferably 100 μm or less since the volume occupied by the separator reduces, which tends to be advantageous in increasing capacity of a battery.

In the present embodiment, the air permeability of a polyolefin microporous film, which is not particularly limited to, is preferably 10 sec/100 cc or more and more preferably 50 sec/100 cc or more; and preferably 1000 sec/100 cc or less and more preferably 500 sec/100 cc or less. The air permeability is preferably 10 sec/100 cc or more since the self-discharge of an electricity storage device is suppressed. In contrast, the air permeability is preferably 1000 sec/100 cc or less since satisfactory charge-discharge characteristics are obtained. The air permeability herein is measured by a method later described in Examples.

Note that the air permeability can be controlled by varying e.g., stretching temperature and stretching ratio.

In the present embodiment, the average pore diameter of a polyolefin microporous film is preferably 0.15 μm or less and more preferably 0.1 μm or less; and the lower limit of the average pore diameter is preferably 0.01 μm or more. The average pore diameter is preferably 0.15 μm or less since the self-discharge of the electricity storage device and capacity drop are suppressed in the case where the polyolefin microporous film is used as the separator for the electricity storage device. The average pore diameter can be controlled by e.g., varying the stretching ratio when the polyolefin microporous film is produced.

In the present embodiment, short-circuit temperature, which is used as an index of heat resistance of a polyolefin microporous film, is preferably 140° C. or more, more preferably 150° C. or more and further preferably 160° C. or more. The short-circuit temperature is preferably 140° C. or more in view of safety of an electricity storage device when the polyolefin microporous film is used as a separator for the electricity storage device.

(Method for Manufacturing a Polyolefin Microporous Film)

In the present embodiment, a method for producing a polyolefin microporous film is not particularly limited to, and a manufacturing method known in the art can be employed. Examples of such a method include a method of forming a porous film by melt-kneading a polyolefin resin composition and a plasticizer, molding the kneaded product into a sheet, followed by stretching, as necessary, and then extracting the plasticizer; a method of forming a porous film by melt-kneading a polyolefin resin composition, extruding the kneaded product at a high draw ratio, followed by heating and stretching to peel a polyolefin crystal interface; a method of forming a porous film by melt-kneading a polyolefin resin composition and an inorganic filler, molding the kneaded product into a sheet, followed by stretching to peel the interface between the polyolefin and the inorganic filler; and a method of forming a porous film by dissolving a polyolefin resin composition, thereafter soaking in a poor solvent for the polyolefin to coagulate the polyolefin; at the same time, remove the solvent.

As an example of the method for producing a porous film, a method of forming a porous film by melt-kneading a polyolefin resin composition and a plasticizer, molding the kneaded product into a sheet, and then extracting the plasticizer will be described below.

First, a polyolefin resin composition and a plasticizer are melt-kneaded. Examples of the melt-kneading method include a method of loading a polyolefin resin and if necessary, other additives in a resin kneading apparatus such as an extruder, a kneader, a laboplastomill, kneading roll and Bambari mixer, adding a plasticizer at an arbitrary ratio and kneading the mixture while melting a resin component with heat. At this time, before the polyolefin resin, other additives and plasticizer are loaded into the resin kneading apparatus, they are preferably preparatorily blended in a predetermined ratio and kneaded in advance by e.g., a Henschel mixer. More preferably, in the preparatory kneading step, only a part of the plasticizer is loaded and kneading is performed by the resin kneading apparatus while side-feeding the remaining plasticizer. In this way, dispersibility of the plasticizer is improved and a sheet compact, which is a melt-kneaded product of a resin composition and a plasticizer, can be stretched at a high rate without film breakage in a later step.

As the plasticizer, a nonvolatile solvent, which can produce a uniform solution of a polyolefin at a temperature of the melting point or higher, can be used. Specific examples of such a nonvolatile solvent include, hydrocarbons such as liquid paraffin and paraffin wax; esters such as dioctyl phthalate and dibutyl phthalate; and higher alcohols such as oleyl alcohol and stearyl alcohol. Among these, liquid paraffin is preferable since it has high compatibility with a polyethylene and a polypropylene and interfacial peeling between a resin and a plasticizer rarely occurs even if a melt-kneaded product is stretched, with the result that uniform stretching tends to be easily made.

The ratio of a polyolefin resin composition and a plasticizer is not particularly limited to as long as they can uniformly melt-kneaded and molded into a sheet. For example, the mass fraction of a plasticizer in a composition composed of a polyolefin resin composition and the plasticizer is preferably 30 to 80 mass % and more preferably 40 to 70 mass %. If the mass fraction of a plasticizer is 80 mass % or less, melt tension during melt processing rarely reduces and moldability tends to be improved. In contrast, if the mass fraction is 30 mass % or more, even if a mixture of a polyolefin resin composition and a plasticizer is stretched at a high ratio, a polyolefin chain will not break. In addition, micro-pore structures are uniformly formed and strength is easily increased.

Subsequently, a melt-kneaded product is molded into a sheet. As a method for producing a sheet compact, for example, a method for producing a sheet compact by extruding a melt-kneaded product, via e.g., a T-die, into a sheet and allowing the sheet in contact with a thermo-conducting body to cool it to a temperature sufficiently lower than the crystallization temperature of a resin component and solidify it. As the thermo-conducting body to be used for cooling to solidify, e.g., a metal, water, air or a plasticizer itself can be used; however, a metal roll is preferred since it has a high thermal conduction efficiency. At the time when a sheet is brought into contact with a metal roll, the sheet is more preferably sandwiched between rolls. This is because, if so, the thermal conduction efficiency is further improved; at the same time, the sheet is oriented to increase film strength and improve surface smoothness of the sheet. The die-lip interval when a melt-kneaded product is extruded into a sheet via a T die, is preferably 400 μm or more and 3000 μm or less and further preferably 500 μm or more and 2500 μm or less. If the die-lip interval is 400 μm or more, e.g., drool is reduced, film quality is less affected by defects such as stripes, with the result that occurrence of film breakage or the like in the following stretching step tends to be prevented. In contrast, if the die-lip interval is 3000 μm or less, a cooling rate is high, with the result that nonuniform cooling can be prevented and the thickness stability of sheet tends to be maintained.

The sheet compact thus obtained is preferably stretched. As a stretching process, either monoaxial stretching or biaxial stretching can be preferably used; however, biaxial stretching is preferable in view of e.g., strength of the porous film obtained. If the sheet compact is biaxially stretched at a high stretching ratio, molecules are oriented in a planar direction and the porous film finally obtained is rarely broken and has a high puncture strength. Examples of the stretching method include simultaneous biaxial stretching, sequential biaxial stretching, multi-stage stretching and multi-time stretching. In view of improvement of puncture strength, uniformity of stretching and shutdown properties, the simultaneous biaxial stretching is preferred.

Note that the simultaneous biaxial stretching herein refers to a stretching method in which stretching in the MD (machine direction of a microporous film) and stretching in the TD (direction crossed at an angle of 90° with the MD of a microporous film) are simultaneously applied. The stretching ratios of individual directions may differ. The sequential biaxial stretching refers to a stretching method in which stretching in the MD or TD is independently carried out. When stretching of one of the directions of MD and TD is carried out, the other direction is placed in an unrestrained condition or fixed so as to have a constant length.

The stretching ratio falls preferably within the range of 20 times or more and 100 times or less in terms of an area stretching ratio, further preferably within the range of 25 times or more and 50 times or less. As the stretching ratios of individual directions, the stretching ratio in the MD preferably falls within the range of 4 times or more and 10 times or less; whereas the stretching ratio in the TD preferably falls within the range of 4 times or more and 10 times or less; and the stretching ratio in the MD more preferably falls within the range of 5 times or more and 8 times or less; whereas, the stretching ratio in the TD more preferably falls within the range of 5 times or more and 8 times or less. If the total area ratio is 20 times or more, the porous film to be obtained tends to successfully have sufficient strength. In contrast, if the total area ratio is 100 times or less, film breakage in a stretching step can be prevented and high productivity tends to be successfully obtained.

The sheet compact may be rolled. The rolling can be carried out, for example, by a pressing method using e.g., a double belt pressing machine. The orientation of particularly a surface-layer portion can be increased by rolling. The rolling area ratio is preferably larger than the equivalent to 3 times or less and more preferably larger than the equivalent to 2 times or less. If the rolling ratio is larger than the equivalent, the degree of orientation of the plane increases and the strength of the porous film finally obtained tends to increase. In contrast, the rolling ratio is preferably 3 times or less. This is because, if so, the difference in the degree of orientation between the surface-layer portion and the interior center is low, a porous structure uniform in a film-thickness direction tends to be successfully formed.

Subsequently, the plasticizer is removed from the sheet compact to form a porous film. Examples of a method for removing a plasticizer include a method of extracting a plasticizer by soaking a sheet compact in an extraction solvent, followed by sufficient drying. The method of extracting a plasticizer may be carried out in a batch process or a continuous process. To suppress contraction of the porous film, the ends of the sheet compact are preferably fixed in soaking and drying steps. Furthermore, the remaining amount of plasticizer in the porous film is preferably less than 1 mass %.

As the extraction solvent, a solvent serving as a poor solvent for a polyolefin resin and a good solvent for a plasticizer and having a boiling point lower than the melting point of the polyolefin resin is preferably used. Examples of such an extraction solvent include hydrocarbons such as n-hexane and cyclohexane; halogenated hydrocarbons such as dichloromethane and 1,1,1-trichloroethane; non-chlorine based halogenated solvents such as hydrofluoroether and hydrofluorocarbon; alcohols such as ethanol and isopropanol; ethers such as diethylether and tetrahydrofuran; and ketones such as acetone and methyl ethyl ketone. Note that these extraction solvents may be recovered by an operation such as distillation and put in recycle use.

To suppress contraction of a porous film, a heat treatment such as heat setting and thermal relaxation may be applied to the porous film after a stretching step or after the porous film is formed. Furthermore, a post treatment such as a hydrophilization treatment with a surfactant or the like and a crosslinking treatment with ionizing radiation or the like may be applied to a porous film.

[Porous Layer]

Furthermore, the separator for the electricity storage device according to the present embodiment may have a porous layer containing an inorganic filler and a resin binder. The position of the porous layer may be at least a part of a surface of a polyolefin microporous film, at least a part of a surface of a thermoplastic polymer coating layer and/or between the polyolefin microporous film and the thermoplastic polymer coating layer. The porous layer may be present on one or both surfaces of the polyolefin microporous film.

(Inorganic Filler)

The inorganic filler to be used in the porous layer is not particularly limited to; however, an inorganic filler having a melting point of 200° C. or more and a high electric insulating property and being electrochemically stable within the application range of a lithium ion secondary battery is preferable.

Examples of the inorganic filler include, but not particularly limited to, oxide ceramics such as alumina, silica, titania, zirconia, magnesia, ceria, yttria, zinc oxide and iron oxide; nitride ceramics such as silicon nitride, titanium nitride and boron nitride; ceramics such as silicon carbide, calcium carbonate, magnesium sulfate, aluminium sulfate, aluminium hydroxide, aluminum hydroxide oxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth and silica sand; and glass fiber. These may be used alone or in combination.

Of them, in order to improve electrochemical stability and heat-resisting property of a multilayer porous film, an aluminum oxide compound such as alumina and aluminum hydroxide oxide and an aluminium silicate compound having no ion-exchange capacity, such as kaolinite, dickite, nacrite, halloysite and pyrophyllite, are preferable. As the aluminum oxide compound, an aluminum hydroxide oxide is particularly preferable. As the aluminium silicate compound having no ion exchange capacity, kaolin mainly constituted of a kaolin mineral, is more preferable since it is inexpensive and easily available. Examples of the kaolin include wet kaolin and fired kaolin obtained by baking wet kaolin. The fired kaolin is particularly preferable in view of electrochemical stability since crystallization water is released as well as impurities are removed in a baking treatment.

The average particle size of the inorganic filler is preferably more than 0.1 μm and 4.0 μm or less, more preferably more than 0.2 μm and 3.5 μm or less and further preferably more than 0.4 μm and 3.0 μm or less. It is preferable to control the average particle size of the inorganic filler within the above range since even if the porous layer is thin (for example, 7 μm or less), thermal contraction at a high temperature can be suppressed.

In the inorganic filler, the ratio of particles having a size of more than 0.2 μm and 1.4 μm or less based on the entire inorganic filler is preferably 2 vol % or more, more preferably 3 vol % or more and further preferably 5 vol % or more. The upper limit thereof is preferably 90 vol % or less and more preferably 80 vol % or less.

In the inorganic filler, the ratio of particles having a size of more than 0.2 μm and 1.0 μm or less based on the entire inorganic filler is preferably 1 vol % or more and more preferably 2 vol % or more. The upper limit thereof is preferably 80 vol % or less and more preferably 70 vol % or less.

In the inorganic filler, the ratio of particles having a size of more than 0.5 μm and 2.0 μm or less based on the entire inorganic filler is preferably 8 vol % or more and more preferably 10 vol % or more. The upper limit thereof is preferably 60 vol % or less and more preferably 50 vol % or less.

In the inorganic filler, the ratio of particles having a size of more than 0.6 μm and 1.4 μm or less based on the entire inorganic filler is preferably 1 vol % or more and more preferably 3 vol % or more. The upper limit thereof is preferably 40 vol % or less and more preferably 30 vol % or less.

It is preferable that the particle size distribution of the inorganic filler be controlled within the above range since even if the porous layer is thin (for example, 7 μm or less), thermal contraction at a high temperature can be suppressed. Examples of a method for controlling the ratio of the size of the inorganic filler particle include a method of reducing the size of the particle by pulverizing the inorganic filler by use of a ball mill, a bead mill, a jet mill or the like.

Examples of shape of the inorganic filler include a tabular, scale-like, needle, columnar, spherical, polyhedron shapes and massive form. Inorganic fillers having the above shapes may be used in combination. The shape of the inorganic filler is not particularly limited to as long as the thermal contraction (described later) of a multilayer porous film formed of the inorganic filler at 150° C. can be suppressed within 10% or less. A polyhedron shape formed of a plurality of planes, a columnar shape and a spindle shape are preferable in view of improving permeability.

The ratio of the inorganic filler in the porous layer can be appropriately determined in view of the binding property of the inorganic filler, the permeability and heat resistance of a multilayer porous film, etc. The ratio is preferably 50 mass % or more and less than 100 mass %, more preferably 70 mass % or more and 99.99 mass % or less, further preferably 80 mass % or more and 99.9 mass % or less and particularly preferably 90 mass % or more and 99 mass % or less.

(Resin Binder)

The type of resin binder is not particularly limited to. If the multilayer porous film of the present embodiment is used as a separator for a lithium ion secondary battery, it is preferable to use a resin binder insoluble in an electrolytic solution of a lithium ion secondary battery and electrochemically stable in the application range of the lithium ion secondary battery.

Specific examples of the resin binder include polyolefins such as a polyethylene and a polypropylene; fluorine-containing resins such as polyvinylidene fluoride and polytetrafluoroethylene; fluorine-containing rubbers such as a vinylidene fluoride-hexafluoropropylene-tetrafluoroethylene copolymer and an ethylene-tetrafluoroethylene copolymer; rubbers such as a styrene-butadiene copolymer and a hydride thereof, an acrylonitrile-butadiene copolymer and a hydride thereof, an acrylonitrile-butadiene-styrene copolymer and a hydride thereof, a methacrylate-acrylate copolymer, a styrene-acrylate copolymer, an acrylonitrile-acrylate copolymer, an ethylene propylene rubber, a polyvinyl alcohol and polyvinyl acetate; cellulose derivatives such as ethylcellulose, methylcellulose, hydroxyethylcellulose and carboxymethylcellulose; and resins having a melting point and/or a glass-transition temperature of 180° C. or more, such as polyphenylene ether, polysulfone, polyethersulfone, polyphenylene sulfide, polyetherimide, polyamide-imide, polyamide and polyester.

In the case where a polyvinyl alcohol is used as a resin binder, the saponification degree thereof is preferably 85% or more and 100% or less. The saponification degree is preferably 85% or more. This is because, if so, when a multilayer porous film is used as a separator for battery, the temperature (short-circuit temperature), at which a short circuit occurs, increases and more satisfactory safe performance tends to be successfully obtained. The saponification degree is more preferably 90% or more and 100% or less, further preferably 95% or more and 100% or less and particularly preferably 99% or more and 100% or less. Furthermore, the polymerization degree of a polyvinyl alcohol is preferably 200 or more and 5000 or less, more preferably 300 or more and 4000 or less and further preferably 500 or more and 3500 or less. The polymerization degree is preferably 200 or more. This is because, if so, an inorganic filler such as fired kaolin, can be allowed to tightly adhere to a porous film with a small amount of polyvinyl alcohol and air permeability of the multilayer porous film tends to be successfully suppressed from increasing due to the formation of a porous layer while maintaining the mechanical strength of the porous layer. In contrast, the polymerization degree is preferably 5000 or less. This is because, if so, e.g., gelatinization in preparing a coating liquid tends to be successfully prevented.

As the resin binder, a latex binder formed of a resin is preferable. If a latex binder formed of a resin is used, more specifically, if a porous layer containing an inorganic filler and the binder is laminated on at least one surface of a porous polyolefin film, ion permeability rarely reduces and high output characteristics tend to be easily obtained, compared to the case of binding a resin binder to a porous film by, for example, dissolving a whole or part of the resin binder in a solvent, applying the obtained solution to at least one surface of a porous polyolefin film to obtain a laminate and removing the solvent by soaking the laminate into a poor solvent or drying the laminate. In addition, also in the case where temperature rapidly increases during abnormal heat generation, smooth shutdown characteristics are obtained and high safety tends to be easily obtained.

As the latex binder formed of a resin, in order to improve electrochemical stability and binding property, binders obtained by emulsion polymerization of an aliphatic conjugated diene monomer and an unsaturated carboxylic acid monomer with other monomers copolymerizable with these are preferred. As an emulsion polymerization method, which is not particularly limited to, a conventionally known method can be used. As a method for adding monomers and other components, which is not particularly limited to, any one of a simultaneous addition method, a stepwise addition method and a continuous addition method can be employed. Furthermore, any one of a one-step polymerization, two-step polymerization or a multi-stage polymerization can be employed.

Examples of the aliphatic conjugated diene monomer, include, but not particularly limited to, 1,3-butadiene, 2-methyl-1,3-butadiene, 2,3-dimethyl-1,3-butadiene, 2-chloro-1,3-butadiene, substituted linear conjugated pentadienes and a substituted and side-chain conjugated hexadienes. These may be used alone or in combination of two or more. Of the aforementioned ones, particularly, 1,3-butadiene is preferable.

Examples of the unsaturated carboxylic acid monomer include, but not particularly limited to, mono or dicarboxylic acids (anhydrides) such as acrylic acid, methacrylic acid, crotonic acid, maleic acid, fumaric acid and itaconic acid. These may be used alone or in combination of two or more. Of the aforementioned ones, particularly, acrylic acid and methacrylic acid are preferable.

Examples of the other monomers copolymerizable with these include, but not particularly limited to, an aromatic vinyl monomer, a vinyl cyanide monomer, an unsaturated alkyl carboxylate monomer, an unsaturated monomer having a hydroxyalkyl group and an unsaturated carboxylic acid amide monomer. These may be used alone or in combination of two or more. Of the aforementioned ones, particularly, an unsaturated alkyl carboxylate monomer is preferable. Examples of the unsaturated alkyl carboxylate monomer include, but not particularly limited to, methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate and 2-ethylhexyl acrylate. These may be used alone or in combination of two or more. Of the aforementioned ones, particularly, methyl methacrylate is preferable.

Note that in addition to these monomers, monomer components other than the aforementioned ones can be further used in order to improve various qualities and physical properties.

The average particle size of a resin binder is preferably 50 to 500 nm, more preferably 60 to 460 nm and further preferably 80 to 250 nm. If the average particle size of a resin binder is 50 nm or more, when a porous layer containing an inorganic filler and a binder is laminated on at least one surface of a porous polyolefin film, ion permeability rarely reduces and high output characteristics are easily obtained. In addition, in the case where temperature rapidly increases during abnormal heat generation, smooth shutdown characteristics are obtained and high safety can be easily obtained. If the average particle size of a resin binder is 500 nm or less, satisfactory binding property is expressed. When a multilayer porous film formed by using the resin binder is used, thermal contraction becomes satisfactory and excellent safety tends to be obtained.

The average particle size of a resin binder can be controlled by controlling e.g., polymerization time, polymerization temperature, composition ratio of starting materials, the order of injecting starting materials and pH.

The thickness of a porous layer is preferably 1 µm or more in order to improve heat resistance and insulating property, and preferably 50 µm or less in order to increase the capacity of a battery and improve permeability thereof. The thickness of a porous layer is more preferably 1.5 µm or more and 20 µm or less, further preferably 2 µm or more and 10 µm or less, further preferably 3 µm or more and 10 µm or less and particularly preferably 3 µm or more and 7 µm or less.

The density of a porous layer is preferably 0.5 to 2.0 g/cm$^3$ and more preferably 0.7 to 1.5 g/cm$^3$. If the density of a porous layer is 0.5 g/cm$^3$ or more, a thermal contraction rate at a high temperature tends to be satisfactory; whereas if the density of a porous layer is 2.0 g/cm$^3$ or less, air permeability tends to reduce.

Examples of a method for forming a porous layer include a method of applying a coating liquid containing an inorganic filler and a resin binder onto at least one surface of a porous film containing a polyolefin resin as a main component to form a porous layer.

As a solvent for the coating liquid, a solvent that can uniformly and stably disperse the inorganic filler and the resin binder is preferable. Examples thereof include N-methylpyrrolidone, N,N-dimethylformamide, N,N-dimethylacetamide, water, ethanol, toluene, hot xylene, dichloromethane and hexane.

In order to improve dispersion stability and applicability, various additives including a dispersant such as a surfactant, a thickener, a wetting agent, a defoaming agent and a pH moderator including an acid and an alkali may be added to the coating liquid. These additives are preferably removed when a solvent is removed; however, they may remain within a porous layer as long as they are electrochemically stable, do not inhibit a battery reaction and are stable up to about 200° C. in the application range of a lithium ion secondary battery.

A method for dispersing the inorganic filler and the resin binder in a solvent of a coating liquid is not particularly limited as long as dispersion characteristics of a coating liquid required for a coating step can be realized. Examples of a mechanical stirring method include a ball mill, a bead mill, a planetary ball mill, a vibratory ball mill, a sand mill, a colloidal mill, an attritor, a roll mill, high-speed impeller dispersion, a disperser, homogenizer, a high-velocity impact mill, ultrasonic dispersion or a stirring vane.

A method for applying a coating liquid to a porous film is not particularly limited as long as the layer-thickness and coating area required can be attained. Examples of the method include a gravure coater method, a small-diameter gravure coater method, a reverse roll coater method, a transfer roll coater method, a kiss-coater method, a dip coater method, a knife coater method, an air doctor coater method, a blade-coater method, a rod coater method, a squeeze coater method, a cast coater method, a die coater method, a screen printing method and a spray coating method.

It is preferable that a surface treatment be applied to a surface of a porous film prior to application of a coating liquid. This is because, if so, the coating liquid can be easily applied; at the same time, adhesiveness of an inorganic filler-containing porous layer after coating to a porous film surface is improved. A surface treatment method is not particularly limited as long as the method does not significantly damage the porous structure of the porous film. Examples of the method include a corona discharge treatment method, a mechanical rough-surface treatment method, a solvent treatment method, an acid treatment method and an ultraviolet oxidation method.

A method for removing a solvent from the coating film after coating is not particularly limited as long as a porous film is not negatively affected. Examples of the method include a method of drying a porous film at its melting point or less while immobilizing the porous film and a method of drying the film under reduced pressure. In order to control contraction stress in the MD of a porous film and a multi-layer porous film, drying temperature, winding tension and the like are preferred to be appropriately controlled.

[Separator]

Separator of the present embodiment has a thermoplastic polymer on at least a part of at least one of the surfaces of a polyolefin microporous film.

(Peel Strength)

To the outermost surface of the separator for the electricity storage device having a thermoplastic polymer coating layer, an aluminum foil (e.g., positive electrode collector) is pressed at a temperature of 25° C. and a pressure of 5 MPa for 3 minutes and peeled. At this time, the peel strength (hereinafter referred to also as "normal temperature peel strength") is preferably 8 gf/cm or less and more preferably 7 gf/cm or less and further preferably 6 gf/cm or less. If the peel strength is 8 gf/cm or less, stickiness is further suppressed and excellent slit performance and winding properties of the separator tend to be obtained.

The present inventors further surprisingly found that if the peel strength falls within the above range, adhesiveness of the separator of the present embodiment to electrodes by hot-press is improved.

The reason why such an effect can be obtained is not known; however, it is considered that the normal temperature peel strength within the above range indicates that a large amount of thermoplastic resin having a high glass-transition temperature is present on the side of the outermost surface of the separator of the present embodiment; whereas a large amount of thermoplastic resin having a low glass-transition temperature is present on the side of the separator of the present embodiment facing a polyolefin microporous film.

In other words, since a large amount of thermoplastic resin having a high glass-transition temperature is present on the side of the outermost surface of the separator of the present embodiment, stickiness is suppressed. In addition, a thermoplastic resin having a high glass-transition temperature is excellent in adhesiveness to an electrode, with the result that the separator having low stickiness and excellent adhesiveness to electrodes was conceivably obtained.

Since a large amount of thermoplastic resin having a low glass-transition temperature is present on the side of the separator of the present embodiment facing a polyolefin microporous film, adhesiveness between the polyolefin microporous film serving as a substrate and the thermoplastic resin improves. As a result, peeling at the interface between the polyolefin microporous film and the thermoplastic resin is suppressed and a separator excellent in adhesiveness to an electrode was conceivably obtained.

To the outermost surface of the separator for the electricity storage device having a thermoplastic polymer coating layer, an aluminum foil (e.g., positive electrode collector) is pressed at a temperature of 80° C. and a pressure of 10 MPa for 3 minutes and peeled. At this time, the peel strength (hereinafter referred to also as "heat-peel strength") is preferably 10 gf/cm or more and more preferably 15 gf/cm or more and further preferably 20 gf/cm or more. Note that the heat-peel strength can be measured by a method described in Examples.

The separator having a heat-peel strength falling within the above range is preferably applied to an electricity storage device (described later) since adhesiveness between electrodes and the separator is excellent.

When a separator and a negative electrode are laminated in the presence of an electrolytic solution, pressurized at a pressure of 10 MPa and a temperature of 80° C. for 2 minutes and then the separator and the negative electrode are peeled, an active material preferably remains (adhering) on the separator in an area ratio of 10% or more.

The 90° peel strength between a polyolefin microporous film and a thermoplastic polymer coating layer is preferably 6 gf/mm or more, more preferably 7 gf/mm or more and more preferably 8 gf/mm or more. If the 90° peel strength between a polyolefin microporous film and a thermoplastic polymer coating layer is 6 gf/mm or more, more excellent adhesiveness between the thermoplastic polymer and the polyolefin microporous film tends to be obtained. As a result, the falling-off of the thermoplastic polymer layer is suppressed and excellent adhesiveness between the separator and electrodes tends to be obtained.

The film thickness of a separator for an electricity storage device is preferably 2 μm or more, more preferably 5 μm or more. The upper limit thereof is preferably 100 μm or less, more preferably 50 μm or less and further preferably 30 μm or less. A film thickness of 2 μm or more is preferred since the strength of a separator for an electricity storage device is secured. In contrast, a film thickness of 100 μm or less is preferred since satisfactory charge-discharge characteristics are obtained.

In the present embodiment, the air permeability of a separator for an electricity storage device is preferably 10 sec/100 cc or more and more preferably 50 sec/100 cc or more. The upper limit thereof is preferably 10000 sec/100 cc or less and further preferably 1000 sec/100 cc or less. An air permeability of 10 sec/100 cc or more is preferred since, if the separator is employed as a separator for an electricity storage device, self-discharge of the electricity storage device can be further suppressed. In contrast, an air permeability of 10000 sec/100 cc or less is preferred since satisfactory charge-discharge characteristics can be obtained. The air permeability of a separator for an electricity storage device can be controlled by varying the stretching temperature and stretching ratio in producing the polyolefin microporous film, the area ratio of a thermoplastic polymer and existence form thereof.

A short-circuit temperature, which is used as an index for heat resistance of a separator for an electricity storage device, is preferably 140° C. or more, more preferably 150° C. or more and further preferably 160° C. or more. A short-circuit temperature of 160° C. or more is preferred in view of safety of an electricity storage device if the separator is used as a separator for the electricity storage device.

(Method for Producing Separator for an Electricity storage device)

A method for forming a thermoplastic polymer on a polyolefin microporous film is not particularly limited. For example, a method of applying a thermoplastic polymer-containing coating liquid to a polyolefin microporous film is mentioned.

The method of applying a thermoplastic polymer-containing coating liquid to a porous film is not particularly limited as long as a requisite layer-thickness and coating area can be realized. Examples of the method include a gravure coater method, a small-diameter gravure coater method, a reverse roll coater method, a transfer roll coater method, a kiss coater method, a dip coater method, a knife coater method, an air doctor coater method, a blade coater method, a rod coater method, a squeeze coater method, a cast coater method, a die-coater method, a screen printing method, a spray coating method, spray coater coating method and an ink jet coating method. Among these, a gravure coater method or a spray coating method is preferred since the degree of freedom of the shape of a thermoplastic polymer after coating is high and a preferable area ratio can be easily obtained.

When a thermoplastic polymer is applied to a polyolefin microporous film, if a coating liquid enters the interior of the microporous film, the surface and interior of pores are buried with an adhesive resin and permeability reduces. For this reason, as a medium for the coating liquid, a poor solvent for a thermoplastic polymer is preferred. A poor solvent for a thermoplastic polymer is preferably used as a medium for the coating liquid. This is because, if so, the coating liquid does not enter the interior of the microporous film and an adhesive polymer is primarily present on the surface of the microporous film, with the result that reduction in permeability is suppressed. As such a medium, water is preferable. A medium which can be used in combination with water, which is not particularly limited, may be e.g., ethanol and methanol.

A surface treatment is preferably applied to a porous film surface prior to application of a coating liquid. This is because, if so, the coating liquid can be easily applied; at the same time, adhesiveness between the porous layer and an adhesive polymer is improved. A surface treatment method is not particularly limited to as long as the method does not significantly damage the porous structure of the porous film. Examples of the method include a corona discharge treatment method, a plasma treatment method, a mechanical rough-surface treatment method, a solvent treatment method, an acid treatment method and an ultraviolet oxidation method.

A method for removing a solvent from the coating film after coating is not particularly limited as long as a porous film is not negatively affected. Examples of the method include a method of drying a porous film at its melting point or less while immobilizing the porous film, a method of drying the film at low temperature under reduced pressure and a method of soaking the coating film in a poor solvent for an adhesive polymer to solidify the adhesive polymer; at the same time, extracting the solvent.

The separator for the electricity storage device is excellent in handling performance at the time of rolling and provides excellent rate characteristics to the electricity storage device, and further has excellent adhesiveness between a thermoplastic polymer and a polyolefin microporous film and excellent permeability. For this reason, use of the separator for the electricity storage device is not particularly limited to; and, the separator is suitably used, for example, in batteries such as a non-aqueous electrolyte secondary battery, condensers, separators for electricity storage devices such as capacitors, and separation of substances.

[Laminate]

The laminate according to the present embodiment is formed by laminating a separator as mentioned above and electrodes. The separator of the present embodiment is allowed to adhere to electrodes and can be used as a laminate. The "adhesion" herein means that the heat-peel strength as mentioned above between a separator and an electrode is preferably 10 gf/cm or more, more preferably 15 gf/cm or more and further preferably 20 gf/cm or more.

The laminate is excellent in handling performance at the time of rolling and provides excellent rate characteristics to the electricity storage device and further has excellent adhesiveness between a thermoplastic polymer and a polyolefin microporous film and excellent permeability. For this reason, use of the laminate is not particularly limited to; and, the laminate can be suitably used, for example, in batteries such as a non-aqueous electrolyte secondary battery, condensers and electricity storage devices such as capacitors.

As the electrode to be used in the laminate of the present embodiment, those described later in Section of "electricity storage device" can be used.

A method for producing a laminate by using the separator of the present embodiment is not particularly limited to. The laminate can be produced, for example, by laminating the separator of the present embodiment and electrodes and, if necessary, applying heat and/or pressure. Heat and/or pressure can be applied in laminating electrodes and a separator. Alternatively, the laminate can be produced by applying heat and/or pressure to a wound body, which is obtained by laminating electrodes and a separator and then rolling in a circular or flat spiral form.

Alternatively, the laminate can be produced by obtaining a laminate of positive electrode-separator-negative electrode-separator, or negative electrode-separator-positive electrode-separator stacked in the order like a flat plate, and if necessary applying heat and/or pressure.

More specifically, the laminate can be produced by preparing the separator of the present embodiment so as to have a longitudinal shape having a width of 10 to 500 mm (preferably 80 to 500 mm) and a length of 200 to 4000 m (preferably 1000 to 4000 m) and laminating the separator so as to satisfy the order of positive electrode-separator-negative electrode-separator, or negative electrode-separator-positive electrode-separator, and if necessary applying heat and/or pressure.

The temperature of heat is preferably 40 to 120° C. The heating time is preferably 5 seconds to 30 minutes. The pressure is preferably 1 to 30 MPa. The time for applying a pressure is preferably 5 seconds to 30 minutes. As the order of application of heat and pressure, heat is applied and then pressure is applied or pressure is applied and then heat is applied, or pressure and heat may be simultaneously applied. Of them, simultaneous application of pressure and heat is preferable.

[Electricity Storage Device]

The separator of the present embodiment can be used in batteries condensers, separators in capacitors or the like and separation of substances. The separator, particularly if it is used as a separator for a non-aqueous electrolyte battery, can provide adhesiveness to electrodes and excellent battery performance.

Now, preferred aspects of the case where the electricity storage device is a non-aqueous electrolyte secondary battery will be described below.

In the case where a non-aqueous electrolyte secondary battery is produced using the separator of the present embodiment, a positive electrode, a negative electrode and a non-aqueous electrolyte are not limited to and those known in the art can be used.

Examples of the positive electrode material include, but not particularly limited to, lithium-containing composite oxides such as $LiCoO_2$, $LiNiO_2$, spinel type $LiMnO_4$ and olivine type $LiFePO_4$.

Examples of the negative electrode material include, but not particularly limited to, carbon materials such as graphite, a carbonaceous material rarely graphitized, a carbonaceous material easily graphitized and a carbon composite material; silicon, tin, metallic lithium and various types of alloy materials.

The non-aqueous electrolyte is not particularly limited to; and, an electrolytic solution prepared by dissolving an electrolyte in an organic solvent can be used. Examples of the organic solvent include propylene carbonate, ethylene carbonate, dimethyl carbonate, diethyl carbonate and ethyl methyl carbonate. Examples of the electrolyte include lithium salts such as $LiClO_4$, $LiBF_4$ and $LiPF_6$.

A method for producing an electricity storage device using the separator of the present embodiment is not particularly limited. In the case where the electricity storage device is a secondary battery, the electricity storage device can be produced, for example, by preparing the separator of the present embodiment so as to have a longitudinal shape having a width of 10 to 500 mm (preferably 80 to 500 mm) and a length of 200 to 4000 m (preferably 1000 to 4000 m); laminating the separator so as to satisfy the order of positive electrode-separator-negative electrode-separator, or negative electrode-separator-positive electrode-separator; rolling the laminate into circular or flat spiral form to obtain a wound body; housing the wound body in a battery can and further injecting an electrolytic solution in the battery can. At this time, heat and/or pressure may be applied to the wound body to form the aforementioned laminate. Alternatively, the electricity storage device can be produced by using a wound body obtained by rolling the aforementioned laminate into a circular or flat spiral form. Alternatively, the electricity storage device can be produced via a step of covering a flat laminate formed in the order of positive electrode-separator-negative electrode-separator, or negative electrode-separator-positive electrode-separator or the aforementioned laminate with a bag-like film, and injecting an electrolytic solution, and as necessary, a step of applying heat and/or pressure to the bag. The above step of applying heat and/or pressure can be carried out before and/or after the step of injecting the electrolytic solution.

Note that the aforementioned measurement values of various parameters are values measured in accordance with measurement methods later described in Examples, unless otherwise specified.

[Second Embodiment]

The porous film according to the present embodiment has
a polyolefin microporous film and a thermoplastic polymer coating layer covering at least a part of at least one of the surfaces of the polyolefin microporous film, in which
the thermoplastic polymer coating layer contains a thermoplastic polymer having a glass-transition temperature of −10° C. or more and 40° C. or less, and
a degree of swelling with an electrolytic solution of 5 times or less.

In the second embodiment, matters except those described below are the same as those of the first embodiment.

(Glass-Transition Temperature)

In the present embodiment, the glass-transition temperature of a thermoplastic polymer is preferably −10° C. or more and 40° C. or less, more preferably 0° C. or more and 35° C. or less and further preferably 15° C. or more and 30° C. or less. In the present embodiment, the glass-transition temperature of a thermoplastic polymer is specified as −10° C. or more and 40° C. or less. Owing to this, adhesiveness between mutual thermoplastic polymers or between the thermoplastic polymer and the polyolefin microporous film is effectively suppressed. In contrast, adhesiveness between a thermoplastic polymer and a polyolefin microporous film tends to be further improved.

Note that the thermoplastic polymer may have a plurality of glass-transition temperatures. In this case, at least one of the glass-transition temperatures may be present in the above temperature range. Preferably, all glass-transition temperatures are present in the above temperature range.

In the present embodiment, the average thickness of a thermoplastic polymer coating layer is not particularly limited. The average thickness of a thermoplastic polymer coating layer on one of the surfaces is preferably 1.5 μm or less, more preferably 1.0 μm or less and further preferably 0.5 μm or less. The average thickness of a thermoplastic polymer is preferably 1.5 μm or less. This is because, if so, reduction in permeability caused by the thermoplastic polymer and adhesiveness between mutual thermoplastic polymers or between the thermoplastic polymer and the polyolefin microporous film are effectively suppressed.

The average thickness of a thermoplastic polymer can be controlled by varying the polymer concentration of a coating liquid, amount of polymer solution to be applied, coating method and coating conditions.

The thickness of a thermoplastic polymer coating layer can be measured by a method described in Examples.

The separator of the present embodiment has a thermoplastic polymer at least on a part of at least one of the surfaces of a polyolefin microporous film. The area ratio (%) of the polyolefin microporous film covered with the thermoplastic polymer coating layer is preferably 70% or less, more preferably 50% or less, further preferably 45% or less and still further preferably 40% or less based on 100% of the total area of the polyolefin microporous film. Furthermore, the area ratio (%) is preferably 5% or more. If the area ratio is 70% or less, blockage of the pores of the polyolefin microporous film by the thermoplastic polymer is suppressed and permeability tends to be successfully further improved. In contrast, if the area ratio is 5% or more, adhesiveness tends to be more improved. The area ratio herein is calculated by a method later described in Examples.

The area ratio can be controlled by varying the polymer concentration of a coating liquid, amount of polymer solution to be applied, coating method and coating conditions.

In the present embodiment, the gel fraction of a thermoplastic polymer, which is not particularly limited, is preferably 90% or more and more preferably 95% or more. If the gel fraction of a thermoplastic polymer is 90% or more, dissolution of the thermoplastic polymer in an electrolytic solution is suppressed and strength of the thermoplastic polymer within a battery tends to be more improved. The gel fraction herein can be obtained based on the measurement of toluene-insoluble matter as described later in Examples.

The gel fraction can be controlled by varying the types and ratio of monomers to be polymerized and polymerization conditions.

The thermoplastic polymer coating layer, on the polyolefin microporous film, has a portion containing the thermoplastic polymer and a portion not containing the thermoplastic polymer in a sea-island configuration; preferably, the portion containing the thermoplastic polymer is formed in a dot pattern. Examples of the shape of islands in sea, which is not particularly limited to, include a linear, dot, grid, stripe and hexagonal patterns. Of them, in view of securing permeability and uniform adhesiveness to electrodes, dots are more preferable. Dots indicate that a portion containing a thermoplastic polymer and a portion not containing the thermoplastic polymer are in a sea-island configuration on the polyolefin microporous film. The interval of dots is preferably 5 μm to 500 μm in view of both adhesiveness to electrodes and cycle characteristics. The average major axis of dots is preferably 20 μm or more and 1000 μm or less, more preferably 20 μm or more and 800 μm or less and further preferably 50 μm or more and 500 μm or less.

In the present embodiment, adhesiveness of the porous film to the electrode active material measured by a method described later is preferably 30% or more.
(Use of Porous Film, Etc.)

Use of the porous film according to the present embodiment is not particularly limited to. The porous film is excellent in handling performance at the time of rolling. When the porous film is used as a separator for an electricity storage device, the electricity storage device shows excellent rate characteristics. Furthermore, adhesiveness between a thermoplastic polymer and a polyolefin microporous film and permeability are excellent. For these reasons, the porous film can be suitably used, for example, in batteries such as a non-aqueous electrolyte secondary battery, condensers, separators for electricity storage devices such as capacitors and separation of substances.

EXAMPLES

Now, the present invention will be more specifically described based on Examples and Comparative Examples below; however, the present invention is not limited to Examples. Measurement and evaluation methods for various physical properties employed in the following Production Examples, Examples and Comparative Examples are as follows. Note that measurement and evaluation were carried out in the conditions of room temperature (23° C.), 1 atm and a relative humidity of 50%, unless otherwise specified.
[Measurement Method]
(1) Viscosity Average Molecular Weight (Hereinafter Referred to Also as "Mv")

Limiting viscosity [η] in a decalin solvent at 135° C. was obtained based on ASRM-D4020 and Mv of polyethylene was calculated in accordance with the following formula:

$$[\eta]=0.00068 \times Mv^{0.67}$$

Furthermore, Mv of polypropylene was calculated in accordance with the following formula:

$$[\eta]=1.10 \times Mv^{0.80}$$

(2) Weight Per Unit Area of Polyolefin Microporous Film

A sample of 10 cm×10 cm square was excised out from a polyolefin microporous film and weight of the sample was measured by electronic balance AEL-200 manufactured by Shimadzu Corporation. The obtained weight was multiplied with 100 to calculate the weight per unit area per film (m$^2$) (g/m$^2$)

(3) Porosity (%) of Polyolefin Microporous Film

A sample of 10 cm×10 cm square was excised out from a polyolefin microporous film and the volume (cm$^3$) and mass (g) of the sample were obtained. Provided that the film density was 0.95 (g/cm$^3$), the porosity was calculated in accordance with the following formula:

$$\text{Porosity}=(\text{volume}-\text{mass/film density})/\text{volume} \times 100$$

(4) Air Permeability (Sec/100 cc)

Degree of air infiltration resistance, which was measured in accordance with JISP-8117 by Gallery air permeability measurement system G-B2 (trade mark) manufactured by TOYOSEIKI KOGYO CO. LTD., was specified as air permeability.

(5) Puncture Strength (g) of Polyolefin Microporous Film

Using a handy compression tester KES-G5 (trade mark) manufactured by KATO TECH CO., LTD., a polyolefin microporous film was immobilized by a sample holder having an opening portion of 11.3 mm in diameter. Subsequently, the center portion of the polyolefin microporous film immobilized was subjected to a puncture test using a needle having a top curvature radius of 0.5 mm at a puncturing rate of 2 mm/sec under an atmosphere of 25° C. A maximum puncturing load was specified as the puncture strength (g).

(6) Average Pore Diameter (μm)

It is known that the fluid in a capillary flows in accordance with the Knudsen flow when the mean free path of the fluid is larger than the pore diameter of the capillary, whereas the fluid flows in accordance with the Poiseuille flow when the mean free path of the fluid is smaller than the pore diameter of the capillary. Then, it is assumed that the air flow in measuring air permeability of a microporous film follows in accordance with the Knudsen flow; whereas the water flow in measuring water penetration rate of a microporous film follows in accordance with the Poiseuille flow.

The average pore diameter d (μm) was obtained based on air permeability rate constant $R_{gas}$ (m$^3$/(m$^2$·sec·Pa)), water permeability rate constant $R_{liq}$/(m$^2$·sec·Pa)), air molecular speed v (m/sec), water viscosity η (Pa·sec), standard pressure $P_s$ (=101325 Pa), porosity ε (%) and film thickness L (μm) in accordance with the following formula:

$$d=2v \times (R_{liq}/R_{gas}) \times (16\eta/3Ps) \times 10^6$$

$R_{gas}$ can be obtained based on air permeability (sec) in accordance with the following formula:

$$R_{gas}=0.0001/(\text{air permeability} \times (6.424 \times 10^{-4}) \times (0.01276 \times 101325))$$

$R_{liq}$ can be obtained based on a water penetration rate (cm$^3$/(cm$^2$·sec·Pa)) in accordance with the following formula:

$$R_{liq}=\text{water penetration rate}/100$$

Note that water penetration rate can be obtained as follows. A microporous film soaked in ethanol in advance was set in a cell made of stainless steel and having a diameter of 41 mm. After the film was washed with water to remove ethanol, water was allowed to permeate at a differential pressure of about 50000 Pa. After 120 sec, the volume of water (cm$^3$) permeated was measured. Based on this, a permeable water volume per unit time/unit pressure/unit area was calculated and specified as a water penetration rate.

The value v was obtained in accordance with the following formula based on gas constant R (=8.314), absolute temperature T (K), circular constant π, and average molecular weight M of air (=2.896×10$^{-2}$ kg/mol).

$$v=((8R \times T)/(\pi \times M))^{1/2}$$

(7) Thickness (μm)
(7)-1 Film Thickness (μm) of Polyolefin Microporous Film and a Separator for an Electricity Storage Device A sample of 10 cm×10 cm square was excised out from each of a polyolefin microporous film and a separator for an electricity storage device. Nine sites (3 points×3 points) in the form of a lattice were selected and measured for film thickness by a micro thickness gage (type KBM manufactured by TOYO SEIKI SEISAKU-SHO, LTD.) at room temperature of 23±2° C. The averages of 9 point measurement values of individual films were specified as the film thickness (μm) of the polyolefin microporous film and the film thickness (μm) of the separator for the electricity storage device, respectively.

(7)-2 Thickness of a Thermoplastic Polymer Coating Layer (μm)

The thickness of a thermoplastic polymer coating layer was measured by observing a section of a separator under a scanning electron microscope (SEM) "model S-4800, manufactured by HITACHI Ltd." A sample of about 1.5 mm×2.0 mm was excised out from the separator and stained with ruthenium. The sample stained and ethanol were placed in a gelatin capsule and frozen with liquid nitrogen and then the sample was broken by a hammer. Osmium was vapor-deposited on the sample and observed at an acceleration voltage of 1.0 kV at a magnification of 30000× to determine the thickness of the thermoplastic polymer layer. Note that in an SEM image of the section, the outermost surface region where a porous structure of a polyolefin microporous film was not observed was determined as the region of a thermoplastic polymer coating layer.

(8) Glass-Transition Temperature of Thermoplastic Polymer

An appropriate amount of coating liquid (nonvolatile content=38 to 42%, pH=9.0) of a thermoplastic polymer was taken on an aluminum plate and dried by a hot-air dryer at 130° C. for 30 minutes. After dried, an aluminum measurement container was charged with the dried film (about 17 mg) and a DSC curve and a DDSC curve were obtained by a DSC determination apparatus (DSC6220, manufactured by Shimadzu Corporation) under a nitrogen atmosphere. Note that measurement conditions were as follows:

(First-Step Temperature Raising Program)

Temperature was raised from 70° C. at a rate of 15° C. per minute. After the temperature reaches 110° C., the temperature was maintained for 5 minutes.

(Second-Step Temperature Decreasing Program)

Temperature was allowed to decrease from 110° C. at a rate of 40° C. per minute. After the temperature reaches −50° C., the temperature was maintained for 5 minutes.

(Third-Step Temperature Raising Program)

Temperature was raised from −50° C. at a rate of 15° C. per minute up to 130° C. During the third-step temperature raising time, DSC and DDSC data were obtained.

The intersection of the base line (the base line of the DSC curve obtained linearly extended toward a high temperature side) with a tangent line at an inflection point (point at which a convex curve was changed to a concave curve) was specified as a glass-transition temperature (Tg).

(9) Gel Fraction of Thermoplastic Polymer (Toluene-Insoluble Matter)

On a Teflon (registered trade mark) plate, a thermoplastic polymer coating liquid (nonvolatile content =38 to 42%, pH=9.0) was placed dropwise by a dropper (5 mm or less in diameter) and dried by a hot-air dryer at 130° C. for 30 minutes. After dried, about 0.5 g (a) of the dried film was weighed and placed in a 50 mL-polyethylene container. To the container, toluene (30 mL) was poured. The container was shaken for 3 hours at room temperature. Thereafter, the content was filtered by a 325 mesh. The toluene-insoluble matter remaining on the mesh was dried by a hot-air dryer at 130° C. for one hour together with the mesh. Note that the dry weight of the 325 mesh used herein was previously measured.

After toluene was evaporated, the dry weight (b) of toluene-insoluble matter was obtained by subtracting the weight of the 325 mesh previously measured from the weight of the dried toluene-insoluble matter+the 325 mesh. The gel fraction (toluene-insoluble matter) was calculated in accordance with the following calculation formula:

Gel fraction (toluene-insoluble matter) of thermoplastic polymer=$(b)/(a) \times 100[\%]$

(10) Degree of Swelling (Times) of a Thermoplastic Polymer with an Electrolytic Solution A thermoplastic polymer or a solution in which a thermoplastic polymer was dispersed was allowed to stand still in an oven at 130° C. for one hour. 0.5 g of the dried thermoplastic polymer was then excised out and placed in a 50 mL-vial container together with 10 g of a solvent mixture of ethylene carbonate:ethyl methyl carbonate=1:2 (volume ratio) to impregnate the polymer with the solvent for 3 hours. Thereafter, the sample was taken out, washed with the aforementioned solvent mixture and the weight (Wa) of the sample was measured. Thereafter, the sample was allowed to stand still in an oven at 150° C. for one hour and the weight (Wb) of the sample was measured. The degree of swelling of a thermoplastic polymer with an electrolytic solution was measured in accordance with the following formula:

Degree of swelling(times) of a thermoplastic polymer with an electrolytic solution=$(Wa-Wb) \div (Wb)$

(11) Area Ratio of Polyolefin Microporous Film Covered with Thermoplastic Polymer Coating Layer The area ratio of a polyolefin microporous film covered with a thermoplastic polymer coating layer was determined by a scanning electron microscope (SEM), "model S-4800, manufactured by HITACHI, Ltd." Osmium was vapor-deposited on a separator for an electricity storage device and the separator was observed at an acceleration voltage of 1.0 kV and a magnification of 50× to obtain the area. Using the obtained area, the area ratio was calculated in accordance with the following formula. Note that the region in which the surface of a polyolefin microporous film was not seen in the SEM image was specified as a thermoplastic polymer region. The measurement was repeated three times and an average value thereof was specified as the area ratio of the sample.

The area ratio of a thermoplastic polymer (%)=the area of thermoplastic polymer÷the total area of image×100

(12) Existence Form (Coated Form) of Thermoplastic Polymer Coating Layer

Existence form (coated form) of a thermoplastic polymer coating layer was determined by vapor-depositing osmium onto a separator for an electricity storage device and observing the separator by a scanning electron microscope (SEM) "model S-4800, manufactured by HITACHI, Ltd." at an acceleration voltage of 1.0 kV and a magnification of 50×. Note that the state in which most of the polyolefin microporous film were covered with the thermoplastic polymer (including a part of the thermoplastic polymer, for example, aggregated and failed to completely cover the polyolefin) was specified as "non-dot form".

(13-1) Area Ratio of Particulate Thermoplastic Polymer

The area ratio (S) of a particulate thermoplastic polymer based on the thermoplastic polymer present on the outermost surface of a separator for an electricity storage device was calculated in accordance with the following formula:

$S(\%)$=Area of particulate thermoplastic polymer÷total area of thermoplastic polymer present on the outermost surface of separator×100

The area of a particulate thermoplastic polymer was determined by use of a scanning electron microscope (SEM) "model S-4800, manufactured by HITACHI, Ltd." More specifically, osmium was vapor-deposited onto a separator for an electricity storage device and observed at an acceleration voltage of 1.0 kV and a magnification of 30000×.

(13-2) Average Particle Size (μm) of Particulate Thermoplastic Polymer

The average particle size of a particulate thermoplastic polymer was determined by vapor-depositing osmium onto a separator for an electricity storage device and observing the separator by a scanning electron microscope (SEM) "model S-4800, manufactured by HITACHI, Ltd." at an acceleration voltage of 1.0 kV and a magnification of 30000×. The largest diameter of the particulate thermoplastic polymer was specified as a particle size and the particle sizes of 20 particles were averaged to obtain an average particle size.

(14) Average Major Axis (μm) of Dot-Form Thermoplastic Polymer

Average major axis of dot-form thermoplastic polymer was determined by vapor-depositing osmium onto a separator for an electricity storage device and observing the separator by a scanning electron microscope (SEM) "model S-4800, manufactured by HITACHI, Ltd." at an acceleration voltage of 1.0 kV and a magnification of 50×. In the portion where the thermoplastic polymer was present, if a thermoplastic polymer was present in the form of dots, the largest diameter of a dot was specified as a major axis and the major axes of 20 dots were averaged to obtain an average major axis of dots. If a thermoplastic polymer was present in the form of lines, grids, stripes and hexagonal patterns, the widest line width of the form was specified as the major axis and the major axes of 20 forms were averaged to obtain an average major axis.

(15) Average Particle Size of Thermoplastic Polymer

The average particle size of a thermoplastic polymer was determined by a particle-size measurement apparatus (Microtrac UPA150, manufactured by Nikkiso Co., Ltd.). Particle sizes were measured in the following conditions: loading index=0.15 to 0.3, measurement time: 300 seconds. Based on the obtained data, 50% particle size was obtained and described as a particle size.

[Evaluation Method]

(16) Adhesiveness Between Separator and Electrode

The adhesiveness between a separator and an electrode was evaluated by the following procedure.

(Fabrication of Positive Electrode)

Lithium cobalt composite oxide (LiCoO$_2$) (92.2 mass %) as a positive electrode active material, a scale-like graphite and acetylene black (2.3 mass % for each) as an electrical conducting material and polyvinylidene fluoride (PVDF) (3.2 mass %) as a binder were dispersed in N-methylpyrrolidone (NMP) to prepare a slurry. The slurry was applied to one of the surfaces of aluminum foil serving as a positive electrode collector of 20 μm in thickness by a die coater, dried at 130° C. for 3 minutes and thereafter subjected to compression molding by a roll pressing machine. The application herein was made such that the amount of positive electrode active material coated was 250 g/m$^2$ and the bulk density of the active material was 3.00 g/cm$^2$.

(Fabrication of Negative Electrode)

An artificial graphite (96.9 mass %) as a negative-electrode active material, an ammonium salt of carboxymethylcellulose (1.4 mass %) as a binder and styrene-butadiene copolymer latex (1.7 mass %) were dispersed in purified water to prepare a slurry. The slurry was applied to one of the surfaces of copper foil serving as a negative electrode collector of 12 μm in thickness by a die coater, dried at 120° C. for 3 minutes and thereafter subjected to compression molding by a roll pressing machine. The application herein was made such that the amount of negative electrode active material coated was 106 g/m$^2$ and the bulk density of the active material was 1.35 g/cm$^2$.

(Adhesiveness Test)

The negative electrode obtained by the above method was cut into pieces of 20 mm in width and 40 mm in length. On each of the negative electrode pieces, an electrolytic solution (manufactured by TOMIYAMA PURE CHEMICAL INDUSTRIES, Ltd.), which was obtained by mixing ethylene carbonate and diethyl carbonate in a ratio of 2:3 (volume ratio), was dripped so as to soak the negative electrode piece and a separator was superposed on the piece. The laminate obtained was placed in an aluminum zip and pressed in the conditions of 80° C. and 10 MPa for 2 minutes. Thereafter, the laminate was taken out and the separator was removed from the electrode.

(Evaluation Criteria)

◯: a negative-electrode active material remained (adhering) in 30% or more of area of a separator.

Δ: a negative-electrode active material remained (adhering) in 10% or more and less than 30% of area of a separator.

X: a negative-electrode active material remained (adhering) in less than 10% of area of a separator.

(17-1) Heat-Peel Strength and Stickiness (Peel Strength of Separator)

A separator and a positive electrode collector (aluminum foil, 20 μm, manufactured by Fuji Imprex Corp.) as a substrate to be attached were cut into pieces of 30 mm×150 mm and laminated. Thereafter, each of the resultant laminates was sandwiched by Teflon (registered trade mark) sheet (NAFLON PTFE sheet TOMBO-No. 9000, manufactured by NICHIAS Corporation). The laminates were pressed in the following conditions to obtain test samples.

Condition 1) pressed at a temperature of 25° C. and a pressure of 5 MPa for 3 minutes Condition 2) pressed at a temperature of 40° C. and a pressure of 5 MPa for 3 minutes Condition 3) pressed at a temperature of 80° C. and a pressure of 10 MPa for 3 minutes The peel strength of the test samples obtained was measured by use of autograph AG-IS (trade mark), manufactured by Shimadzu Corporation, in accordance with JISK6854-2 at a tension rate of 200 mm/minute. Based on the obtained results, the peel strength of the separator was evaluated in accordance with the following evaluation criteria.

Evaluation criteria for stickiness (handling performance of separator): Evaluation criteria for peel strength after pressed in condition 1)

◉: peel strength was 4 gf/cm or less

◯: peel strength was more than 4 gf/cm and 6 gf/cm or less

Δ: peel strength was more than 6 gf/cm and 8 gf/cm or less

X: peel strength was more than 8 gf/cm

Evaluation criteria for stickiness (handling performance of separator): Evaluation criteria for peel strength after pressed in condition 2)

◉: peel strength was 4 gf/cm or less

◯: peel strength was more than 4 gf/cm and 6 gf/cm or less

Δ: peel strength was more than 6 gf/cm and 8 gf/cm or less

X: peel strength was more than 8 gf/cm

Evaluation criteria for heat-peel strength: Evaluation criteria for peel strength after pressed in condition 3)

◯: peel strength was 10 gf/cm or more

X: peel strength was less than 10 gf/cm (17-2) Handling Performance

From a porous film, two pieces (2 cm in width×15 cm in length) were cut out, arranged such that thermoplastic polymer coating surfaces faced each other and pressed at 25° C. and 5 MPa for 3 minutes. An edge of the sample obtained was picked up and folded back at an angle of 180° and peeled at a distance of 25 mm. Then, in accordance with JISZ7127, the edges of each of the porous films were immobilized by a chuck of a tension tester (AG-100A manufactured by Shimadzu Corporation) and peeled at a rate of 5.0 mm/s at an angle of 180° to measure adhesion force. Values of load applied to the sample in order to peel the film from 25 mm until 75 mm after initiation of measurement were averaged and specified as the peel strength of the porous film. Based on the obtained results, handling performance was evaluated in the following evaluation criteria.

◯: peel strength was less than 4 gf
Δ: 4 gf or more and less than 8 gf
X: 8 gf or more

(18) Wettability of Thermoplastic Polymer

A thermoplastic polymer solution (solid substance concentration: 3%) was applied onto an A4 size polyolefin microporous film in accordance with a gravure method using a bar coater, dried in an oven of 60° C. for 5 minutes to remove water. After dried, a 10 cm-square piece was excised out from the separator, soaked in ethanol in a petri dish and washed directly by an ultrasonic cleaner (model US-102, manufactured by SND Co., Ltd., oscillatory frequency: 38 kHz) for one minute. The separator piece was taken out and dried by evaporating ethanol at normal temperature.

(Evaluation Criteria)

◯: polyolefin microporous film on the surface of which a thermoplastic polymer was present.

X: polyolefin microporous film on the surface of which a thermoplastic polymer was not present.

(19-1) Adhesion Force Between Thermoplastic Polymer Coating Layer and Polyolefin Microporous Film To the thermoplastic polymer coating layer of a separator, a tape of 12 mm in width×100 mm in length (manufactured by 3M) was attached. The force applied when the tape was removed from the sample at a rate of 50 mm/minute was measured by 90°-peel strength measurement apparatus (product name IP-5N, manufactured by IMADA CO., LTD.). Based on the measurement results obtained, the adhesion force was evaluated in accordance with the following evaluation criteria.

◯: 6 gf/mm or more
X: less than 6 gf/mm (19-2) Adhesiveness Between Thermoplastic Polymer and Polyolefin Microporous Film A thermoplastic polymer solution (solid substance concentration: 3%) was applied onto an A4 size polyolefin microporous film in accordance with a gravure method using a bar coater and dried in an oven of 60° C. for 5 minutes to remove water, to obtain a porous film. After dried, a 10 cm-square piece was excised out from the porous film obtained, soaked in ethanol in a petri dish and washed directly by an ultrasonic cleaner (model US-102, manufactured by SND Co., Ltd., oscillatory frequency: 38 kHz) for 5 minutes. The porous-film piece was taken out and dried by evaporating ethanol at normal temperature. The obtained porous-film piece was observed with the naked eye. Based on the observation results obtained, the adhesiveness between the thermoplastic polymer and the polyolefin microporous film was evaluated in accordance with the following evaluation criteria.

◯: polyolefin microporous film on the surface of which a thermoplastic polymer was present X: polyolefin microporous film on the surface of which a thermoplastic polymer was not present or even in the case of a polyolefin microporous film on the surface of which a thermoplastic polymer was present, the thermoplastic polymer slips off when the portion of the thermoplastic polymer was touched by a finger.

(20) Winding Properties and Cycle Characteristics of Battery (20-1) Preparation of Sample for Evaluation <Electrode>

A positive electrode and a negative electrode were fabricated in the same manner as in Section (16) adhesiveness between separator and electrode. The positive electrode and negative electrode were cut to obtain bands having a width of about 57 mm and 58 mm, respectively, to provide electrodes for evaluation.

<Preparation of Non-Aqueous Electrolyte>

A non-aqueous electrolyte was prepared by dissolving $LiPF_6$ as a solute in a solvent mixture of ethylene carbonate/ethyl methyl carbonate=½ (volume ratio) so as to obtain a concentration of 1.0 mol/L.

<Separator>

The separator obtained in each of Examples and Comparative Examples was sliced to obtain a 60 mm-separator band for evaluation.

(20-2) Evaluation of Winding Properties

The negative electrode, separator, positive electrode, and separator obtained in Section (20-1) were laminated in this order and rolled by applying a winding tension of 250 gf several rounds like a spiral to prepare an electrode laminate. Ten electrode laminates were fabricated, visually observed with respect to the presence or absence of twist and wrinkle in the separators and evaluated in accordance with the following evaluation criteria.

(Evaluation Criteria)

◯: No appearance defect such as twist and wrinkle was observed.

Δ: A single appearance defect such as twist and wrinkle was observed.

X: At least two appearance defects such as twist and wrinkle were observed.

(20-3) Evaluation of Cycle Characteristics of Battery

<Assembly of Battery>

The negative electrode, separator, positive electrode, and separator obtained in Section (20-1) were laminated in this order and rolled by applying a winding tension of 250 gf at a rolling rate of 45 mm/second, several rounds like a spiral to form an electrode laminate. The electrode laminate was housed in a stainless steel container having an outer diameter of 18 mm and a height of 65 mm. An aluminum tab guided out from a positive electrode collector was weld to a terminal of the cover of the container; whereas, a nickel tab guided out from a negative electrode collector was welded to the wall of the container. Thereafter, the container was dried under vacuum at 80° C. for 12 hours. The aforementioned non-aqueous electrolyte was injected in the battery container assembled in an argon box and the battery container was sealed.

<Pretreatment>

The battery assembled was subjected to constant-current charging at a current value of ⅓C up to a voltage of 4.2 V and then subjected to constant-voltage charging at a voltage of 4.2 V for 8 hours. Thereafter, the battery was discharged at a current value of ⅓C up to termination voltage of 3.0 V. Subsequently, the battery was subjected to constant-current charging at a current value of 1 C to a voltage of 4.2 V and then subjected to constant-voltage charging at 4.2 V for 3 hours. Thereafter, the battery was discharged at a current value of 1 C up to termination voltage of 3.0 V. Finally, the battery was subjected to constant-current charging at a current value of 1 C to 4.2 V and then subjected to constant-voltage charging at 4.2 V for 3 hours. This was specified as a pretreatment. Note that 1C represents a current value at which the reference capacity of a battery is discharged for one hour.

<Cycle Test>

The battery pretreated was discharged under the following conditions: temperature of 25° C., a discharge current of 1 A, up to a discharge termination voltage of 3 V, and thereafter charged at a charge current of 1 A up to charge termination voltage of 4.2 V. This was specified as a single cycle. The cycle of charge-discharge was repeated and the capacity retention rate after 200 cycles based on the initial capacity was obtained. Based on the capacity retention rate, cycle characteristics were evaluated in accordance with the following criteria.
(Evaluation Criteria)
⊚: capacity retention rate of 95% or more and 100% or less
◯: capacity retention rate of 90% or more and less than 95%
X: capacity retention rate of less than 90%

Example A

Production Example 1-1A

Production of Polyolefin Microporous Film 1A

A high-density polyethylene (homopolymer) having Mv of 700,000 (45 parts by mass), a high-density polyethylene (homopolymer) having Mv of 300,000 (45 parts by mass) and a mixture of a polypropylene (homopolymer) having Mv of 400,000 and a polypropylene (homopolymer) having Mv of 150,000 (in a mass ratio=4:3) (10 parts by mass) were dry-blended by a tumbler blender. To the obtained polyolefin mixture (99 parts by mass), tetrakis-[methylene-(3',5'-di-t-butyl-4'-hydroxyphenyl)propionate]methane (1 part by mass) serving as an antioxidant was added and dry-blended by using the tumbler blender again to obtain a mixture. The obtained mixture was supplied to a double screw extruder through a feeder under a nitrogen atmosphere. Furthermore, liquid paraffin (a kinetic viscosity of $7.59 \times 10^{-5}$ $m^2/s$ at 37.78° C.) was injected into the extruder cylinder by a plunger pump. The driving conditions of the feeder and pump were controlled such that the ratio of liquid paraffin in the total mixture to be extruded was 65 parts by mass, in other words, such that a polymer concentration was 35 parts by mass.

Subsequently, they were melt-kneaded in the double screw extruder while being heated at 230° C. and the obtained melt-kneaded product was extruded on a cooling roller controlled at a surface temperature of 80° C., via a T-die. The extruded product was allowed to be in contact with the cooling roller, molded (casted) and cooled to solidify to obtain a sheet-like molded product. The sheet was stretched by a simultaneous biaxial stretching machine at a stretching ratio of 7×6.4 times at a temperature of 112° C. and soaked in dichloromethane. After liquid paraffin was removed by extraction, the sheet was dried and stretched twofold by a tenter stretching machine at a temperature of 130° C. in the transverse direction. Thereafter, the stretched sheet was relaxed in the width direction by about 10% and subjected to a heat treatment to obtain polyolefin microporous film 1A shown in Table 1.

Physical properties of polyolefin microporous film 1A obtained were measured by the above methods. Furthermore, the obtained polyolefin microporous film was directly used as a separator and evaluated by the above methods. The obtained results are shown in Table 1.

Production Example 1-2A

Production of Polyolefin Microporous Film 2A

The same operation as in Production Example 1-1A was repeated except that the stretching temperature and the relaxation rate were controlled to obtain polyolefin microporous film 2A. The obtained polyolefin microporous film 2A was evaluated by the above methods in the same manner as in Production Example 1-1A. The obtained results are shown in Table 1.

Production Example 1-3A

Production of Polyolefin Microporous Film 3A

A high-density polyethylene (homopolymer) having a viscosity average molecular weight of 700,000 (47.5 parts by mass), a high-density polyethylene (homopolymer) having a viscosity average molecular weight of 250,000 (47.5 parts by mass) and a polypropylene (homopolymer) having a viscosity average molecular weight of 400,000 (5 parts by mass) were dry-blended by a tumbler blender. To the obtained polymer mixture (99 parts by mass), pentaerythrityl-tetrakis-[3-(3,5-di-t-butyl-4-hydroxyphenyl)propionate] (1 part by mass) serving as an antioxidant was added and dry-blended by using the tumbler blender again to obtain a mixture of the polymers. The obtained polymer mixture was replaced with nitrogen and then supplied to a double screw extruder through a feeder under a nitrogen atmosphere. Furthermore, liquid paraffin was injected into the extruder cylinder by a plunger pump.

They were melt-kneaded, and the feeder and pump were controlled such that the ratio of liquid paraffin in the total mixture to be extruded was 67 mass % (resin composition concentration: 33 mass %). The melt-kneaded product was extruded on a cooling roller via a T-die and casted to obtain a sheet-like molded product. Thereafter, the same operation was repeated as in Production Example 1-1A except that the stretching temperature and the relaxation rate were controlled to obtain polyolefin microporous film 3A. Polyolefin microporous film 3A obtained was evaluated by the above methods in the same manner as in Production Example 1-1A. The obtained results are shown in Table 1.

Production Example 1-4A

Production of Polyolefin Microporous Film 4A

An ultrahigh molecular weight polyethylene having a viscosity average molecular weight of 2,000,000 (25 parts by mass), a high-density polyethylene (homopolymer) having a viscosity average molecular weight of 700,000 (15 parts by mass), a high-density polyethylene having a viscosity average molecular weight of 250,000 (30 parts by mass) and a polyethylene copolymer (30 parts by mass) having a viscosity average molecular weight of 120,000 and a unit content of propylene of 1 mol % were dry-blended by a tumbler blender. To the obtained polymer mixture (99 parts by mass), pentaerythrityl-tetrakis-[3-(3,5-di-t-butyl-4-hydroxyphenyl)propionate] (0.3 parts by mass) serving as an antioxidant was added and dry-blended by using the tumbler blender again to obtain a mixture of the polymers. The obtained polymer mixture was replaced with nitrogen and then supplied to a double screw extruder through a feeder under a nitrogen atmosphere. Furthermore, liquid paraffin was injected into the extruder cylinder by a plunger pump.

They were melt-kneaded, and the feeder and pump were controlled such that the ratio of liquid paraffin in the total mixture to be extruded was 65 mass % (resin composition concentration: 35 mass %). The melt-kneaded product was extruded on a cooling roller via a T-die and casted to obtain a sheet-like molded product. Thereafter, the same operation was repeated as in Production Example 1-1A except that the stretching temperature and the relaxation rate were controlled to obtain polyolefin microporous film 4A. Polyolefin microporous film 4A obtained was evaluated by the above methods in the same manner as in Production Example 1-1A. The obtained results are shown in Table 1.

Production Example 1-5A

Production of Polyolefin Microporous Film 5A

The same operation was repeated as in Production Example 1-3A except that the stretching temperature and the relaxation rate were controlled to obtain polyolefin microporous film 5. Polyolefin microporous film 5 obtained was evaluated by the above methods in the same manner as in Production Example 1-1A. The obtained results are shown in Table 1.

Production Example 1-6A

Production of Polyolefin Microporous Film 6A

An ultrahigh molecular weight polyethylene having a viscosity average molecular weight of 1,000,000 (19.2 parts by mass), a high-density polyethylene having a viscosity average molecular weight of 250,000 (12.8 parts by mass), dioctyl phthalate (DOP) (48 parts by mass) and fine powder silica (20 parts by mass) were mixed, granulated and thereafter melt-kneaded by a double screw extruder provided with a T-die at the front edge, extruded, extended from both sides by a heated roller to obtain a sheet-like molded product having a thickness of 110 μm. DOP and fine powder silica were removed by extraction from the molded product to prepare a microporous film. Two sheets of the microporous films were laminated, stretched 5 times in the MD at 120° C. and twofold in the TD at 120° C. and finally treated with heat at 137° C. The obtained polyolefin microporous film 6A was evaluated by the above methods in the same manner as in Production Example 1-1A. The obtained results are shown in Table 1.

Production Example 1-7A

Production of Polyolefin Microporous Film 7A

Aluminum hydroxide oxide (an average particle size: 1.0 μm) (96.0 parts by mass) and acryl latex (solid substance concentration: 40%, an average particle size: 145 nm, the lowest film formation temperature: 0° C. or less) (4.0 parts by mass) and an aqueous ammonium polycarboxylate solution (SN dispersant 5468, manufactured by San Nopco Limited) (1.0 part by mass) were uniformly dispersed in water (100 parts by mass) to prepare a coating liquid. The coating liquid was applied to a surface of polyolefin resin porous film 1A by use of a microgravure coater and dried at 60° C. to remove water to obtain a porous layer having a thickness of 2 μm. In this manner, polyolefin microporous film 7A was obtained. Polyolefin microporous film 7A obtained was evaluated by the above methods in the same manner as in Production Example 1-1A. The obtained results are shown in Table 1.

Production Example 1-8A

Production of Polyolefin Microporous Film 8A

A porous layer of 4 μm in thickness was formed on one of the surfaces of polyolefin microporous film 1A in the same manner as in Production Example 1-7A to obtain polyolefin microporous film 8A. Polyolefin microporous film 8A obtained was evaluated by the above methods in the same manner as in Production Example 1-1A. The obtained results are shown in Table 1.

Production Example 1-9A

Production of Polyolefin Microporous Film 9A

A porous layer of 3 μm in thickness was formed on one of the surfaces of polyolefin microporous film 2A in the same manner as in Production Example 1-7A to obtain polyolefin microporous film 9A. Polyolefin microporous film 9A obtained was evaluated by the above methods in the same manner as in Production Example 1-1A. The obtained results are shown in Table 1.

Production Example 1-10A

Production of Polyolefin Microporous Film 10A

A porous layer of 7 μm in thickness was formed on one of the surfaces of polyolefin microporous film 5A in the same manner as in Production Example 1-7A to obtain polyolefin microporous film 10A. Polyolefin microporous film 10A obtained was evaluated by the above methods in the same manner as in Production Example 1-1A. The obtained results are shown in Table 1.

Production Example 1-11A

Production of Polyolefin Microporous Film 11A

Fired kaolin (obtained by subjecting baking at high temperature to wet kaolin containing kaolinite ($Al_2Si_2O_5(OH)_4$) as a main component; an average particle size: 1.8 μm) (95.0 parts by mass), acryl latex (solid substance concentration: 40%, an average particle size: 220 nm, the lowest film formation temperature: 0° C. or less) (5.0 parts by mass) and an aqueous ammonium polycarboxylate solution (SN dispersant 5468, manufactured by San Nopco Limited) (0.5 parts by mass) were uniformly dispersed in water (180 parts by mass) to prepare a coating liquid. The coating liquid was applied to a surface of polyolefin microporous film 3A by use of a microgravure coater, dried at 60° C. to remove water to obtain a porous layer having a thickness of 6 μm. In this manner, polyolefin microporous film 11A was obtained. Polyolefin microporous film 11A obtained was evaluated by the above methods in the same manner as in Production Example 1-1A. The obtained results are shown in Table 1.

Production Example 1-12A

Production of Polyolefin Microporous Film 12A

The same operation as in Production Example 1-1A was repeated except that the stretching temperature and the relaxation rate were controlled to obtain a polyolefin microporous film having a weight per unit area: 4.6 g/m², film thickness: 7 μm, porosity: 38%, air permeability: 150 seconds, puncture strength: 270 g, average pore diameter: 0.070 μm. A porous layer of 3 μm in thickness was formed on one of the surfaces of the polyolefin microporous film in the same manner as in Production Example 1-7A to obtain polyolefin microporous film 12A. Polyolefin microporous film 12A obtained was evaluated by the above methods in the same manner as in Production Example 1-1A. The obtained results are shown in Table 1.

Five minutes after the aqueous ammonium persulfate solution was added, a mixture of methyl methacrylate (38.5 parts by mass), n-butyl acrylate (19.6 parts by mass), 2-ethylhexyl acrylate (31.9 parts by mass), methacrylate (0.1 part by mass), acrylic acid (0.1 part by mass), 2-hydroxyethyl methacrylate (2 parts by mass), acrylamide (5 parts by mass), glycidyl methacrylate (2.8 parts by mass), trimethylolpropane triacrylate (A-TMPT, manufactured by Shin-Nakamura Chemical Co., Ltd.) (0.7 parts by mass), "Aqualon KH1025" (registered trade mark, a 25% aqueous solution, manufactured by Daiichi Kogyo Seiyaku Co., Ltd.)

TABLE 1

| | Polyolefin microporous film No. | | | | | | | |
|---|---|---|---|---|---|---|---|---|
| | 1A | 2A | 3A | 4A | 5A | 6A | 7A | 8A |
| Weight per unit area (g/m²) | 7.0 | 5.3 | 6.4 | 10.0 | 6.4 | 8.4 | Aluminum hydroxide oxide (2 μm) was applied to a polyolefin microporous film 1A | Aluminum hydroxide oxide (4 μm) was applied to a polyolefin microporous film 1A |
| Film thickness (μm) | 12 | 9 | 15 | 16 | 18 | 18 | | |
| Porosity (%) | 40 | 40 | 59 | 38 | 62 | 51 | | |
| Air permeability (s/100 cc) | 150 | 150 | 75 | 380 | 89 | 90 | | |
| Puncture strength (g) | 320 | 300 | 440 | 510 | 440 | 400 | | |
| Average pore diameter (μm) | 0.075 | 0.066 | 0.056 | 0.055 | 0.051 | 0.110 | | |
| Thickness of inorganic filler layer (μm) | — | — | — | — | — | — | 2 | 4 |
| Stickiness 25° C. | ◎ | ◎ | ◎ | ◎ | ◎ | ◎ | ◎ | ◎ |
| 40° C. | ◎ | ◎ | ◎ | ◎ | ◎ | ◎ | ◎ | ◎ |
| Adhesiveness | X | X | X | X | X | X | X | X |
| Winding properties | ◎ | ◎ | ◎ | ◎ | ◎ | ◎ | ◎ | ◎ |
| Cycle characteristics | ○ | ◎ | ◎ | ○ | ◎ | ○ | ○ | ○ |

| | Polyolefin microporous film No. | | | |
|---|---|---|---|---|
| | 9A | 10A | 11A | 12A |
| Weight per unit area (g/m²) | Aluminum hydroxide oxide (3 μm) was applied to a polyolefin microporous film 2A | Aluminum hydroxide oxide (7 μm) was applied to a polyolefin microporous film 5A | Fired kaolin (6 μm) was applied to a polyolefin microporous film 3A | Aluminum hydroxide oxide (3 μm) was applied to a polyolefin microporous film (weight per unit area: 4.6 g/m², film thickness: 7 μm, porosity: 38%, air permeability: 150 seconds, puncture strength: 270 g, average pore diameter: 0.070 μm) |
| Film thickness (μm) | | | | |
| Porosity (%) | | | | |
| Air permeability (s/100 cc) | | | | |
| Puncture strength (g) | | | | |
| Average pore diameter (μm) | | | | |
| Thickness of inorganic filler layer (μm) | 3 | 7 | 6 | 3 |
| Stickiness 25° C. | ◎ | ◎ | ◎ | ◎ |
| 40° C. | ◎ | ◎ | ◎ | ◎ |
| Adhesiveness | X | X | X | X |
| Winding properties | ◎ | ◎ | ◎ | ◎ |
| Cycle characteristics | ◎ | ◎ | ◎ | ◎ |

Production Example 2-1A

Production of Starting Polymer 1

In a reaction container equipped with a stirrer, a reflux condenser, a driptank and a thermometer, ion exchange water (70.4 parts by mass), "Aqualon KH1025" (registered trade mark, a 25% aqueous solution, manufactured by Daiichi Kogyo Seiyaku Co., Ltd.) (0.5 parts by mass) and "Adekaria soap SR1025" (registered trade mark, a 25% aqueous solution, manufactured by ADEKA CORP.) (0.5 parts by mass) were supplied. The interior temperature of the reaction container was raised to 80° C. While maintaining the temperature at 80° C., ammonium persulfate (an aqueous 2% solution) (7.5 parts by mass) was added.

(3 parts by mass), "Adekaria soap SR1025" (registered trade mark, a 25% aqueous solution, manufactured by ADEKA CORP.) (3 parts by mass), sodium p-styrenesulfonate (0.05 parts by mass), ammonium persulfate (a 2% aqueous solution) (7.5 parts by mass), γ-methacryloxypropyltrimethoxysilane (0.3 parts by mass) and ion exchange water (52 parts by mass) was mixed by a homo mixer for 5 minutes to prepare an emulsion. The obtained emulsion was added dropwise from the driptank to the reaction container over 150 minutes.

After completion of dropwise addition of the emulsion, the interior temperature of the reaction container was maintained at 80° C. for 90 minutes and thereafter reduced to room temperature. The obtained emulsion was adjusted to pH=9.0 with an aqueous ammonium hydroxide solution (an aqueous 25% solution) to obtain an acrylic copolymer latex of a concentration 40% (starting polymer 1A). Starting polymer 1A obtained was evaluated by above methods. The obtained results are shown in Table 2.

Production Examples 2-2A to 2-8A

Starting Polymers 2A to 8A

Acrylic copolymer latexes (starting polymers 2A to 8A) were obtained in the same manner as in obtaining polymer 1A except that compositions of monomers and the other starting materials were changed as described in Table 2. Starting polymers 2A to 8A obtained were evaluated by the above methods. The obtained results are shown in Table 2.

Starting polymers 9A to 18A described below were evaluated by the above methods. The obtained results are shown in Table 2. Note that Tg values of starting polymers 9A to 18A were all rough estimations by the FOX formula.

Starting polymer 9A: styrene-butadiene polymer (particle size: 300 nm, Tg: 0° C., toluene-insoluble matter: 95%, degree of swelling with an electrolyte solvent: 1.7 times)

Starting polymer 10A: styrene-butadiene polymer (particle size: 377 nm, Tg: 30° C., toluene-insoluble matter: 96%, degree of swelling with an electrolyte solvent: 1.7 times)

Starting polymer 11A: styrene-butadiene polymer (particle size: 380 nm, Tg: 90° C., toluene-insoluble matter: 95%, degree of swelling with an electrolyte solvent: 1.6 times)

Starting polymer 12A: acrylic polymer (particle size: 380 nm, Tg: 90° C., toluene-insoluble matter: 98%, degree of swelling with an electrolyte solvent: 2.8 times), obtained by using the same monomers and starting materials as used for obtaining starting polymers 1 to 8.

Starting polymer 13A: acrylic polymer (particle size: 50 nm, Tg: 90° C., toluene-insoluble matter: 97%, degree of swelling with an electrolyte solvent: 2.9 times), obtained by using the same monomers and starting materials as used for obtaining starting polymers 1 to 8

Starting polymer 14A: acrylic polymer (particle size: 50 nm, Tg: 30° C., toluene-insoluble matter: 99%, degree of swelling with an electrolyte solvent: 3.0 times), obtained by using the same monomers and starting materials as used for obtaining starting polymers 1 to 8

Starting polymer 15A: acrylic polymer (particle size: 500 nm, Tg: 30° C., toluene-insoluble matter: 98%, degree of swelling with an electrolyte solvent: 2.7 times), obtained by using the same monomers and starting materials as used for obtaining starting polymers 1 to 8

Starting polymer 16A: acrylic polymer (particle size: 500 nm, Tg: 90° C., toluene-insoluble matter: 96%, degree of swelling with an electrolyte solvent: 3.2 times), obtained by using the same monomers and starting materials as used for obtaining starting polymers 1 to 8

Starting polymer 17A: acrylic polymer (particle size: 1000 nm, Tg: 90° C., toluene-insoluble matter: 96%, degree of swelling with an electrolyte solvent: 3.0 times), obtained by using the same monomers and starting materials as used for obtaining starting polymers 1 to 8

Starting polymer 18A: acryl (core-shell) (particle size: 350 nm, core Tg: −20° C., shell Tg: 50° C., toluene-insoluble matter: 96%, degree of swelling with an electrolyte solvent: 3.2 times) obtained by using the same monomers and starting materials as used for obtaining starting polymers 1 to 8.

TABLE 2

| | | | | Starting polymer | | | | | | | |
| | | | | Low Tg | | | | | High Tg | | |
| Content | Type | Name of starting material | Active ingredient | 1A | 2A | 3A | 4A | 5A | 6A | 7A | 8A |
| --- | --- | --- | --- | --- | --- | --- | --- | --- | --- | --- | --- |
| Initial supply | Emulsifying agent | KH1025 | 25% | 0.5 | 1.8 | 1.8 | 0.34 | 0.5 | 0.34 | 0.34 | 0.32 |
| | | SR1025 | 25% | 0.5 | 1.8 | 1.8 | 0.34 | 0.5 | 0.34 | 0.34 | 0.32 |
| | | Ion exchange water | — | 70.4 | 70.4 | 70.4 | 70.4 | 70.4 | 70.4 | 70.4 | 70.4 |
| | Initiator | APS (aq) | 2% | 7.5 | 7.5 | 7.5 | 7.5 | 7.5 | 7.5 | 7.5 | 7.5 |
| Emulsion | Monomer | MMA | 100% | 38.5 | 30.5 | 41.3 | 15.9 | 52.5 | 71.5 | 89 | 55.5 |
| | | BA | 100% | 19.6 | 60.8 | 50 | 74.5 | 19.5 | 18.9 | 1.4 | 34.9 |
| | | EHA | 100% | 31.9 | 2 | 2 | 2 | 20.4 | 2 | 2 | 2 |
| | Functional group containing monomer | MAA | 100% | 0.1 | 1 | 1 | 0.1 | 0.1 | 0.1 | 0.1 | 0.1 |
| | | AA | 100% | 0.1 | 1.5 | 1.5 | 0.1 | 0.1 | 0.1 | 0.1 | 0.1 |
| | | HEMA | 100% | 2 | 2 | 2 | 2 | 2 | 2 | 2 | 2 |
| | | AM | 100% | 5 | 0.2 | 0.2 | 5 | 5 | 5 | 5 | 5 |
| | | GMA | 100% | 2.8 | 2 | 2 | 0.4 | 0.4 | 0.4 | 0.4 | 0.4 |
| | Emulsifying agent | KH1025 | 25% | 3 | 3 | 3 | 3 | 3 | 3 | 3 | 2.6 |
| | | SR1025 | 25% | 3 | 3 | 3 | 3 | 3 | 3 | 3 | 2.6 |
| | | NaSS | 100% | 0.05 | 0.05 | 0.05 | 0.05 | 0.05 | 0.05 | 0.05 | 0.05 |
| | Crosslinking agent | A-TMPT | 100% | 0.7 | 0.7 | 0.7 | 0.4 | 0.4 | 0.4 | 0.4 | 0.4 |
| | | γ-methacryloxypropyl-trimethoxysilane | 100% | 0.3 | 0.3 | 0.3 | 0.3 | 0.3 | 0.3 | 0.3 | 0.3 |
| | Initiator | APS (aq) | 2% | 7.5 | 7.5 | 7.5 | 7.5 | 7.5 | 7.5 | 7.5 | 7.5 |
| | | Ion exchange water | — | 52 | 52 | 52 | 52 | 52 | 52 | 52 | 52 |
| Physical property of latex | | Glass-transition temperature Tg | (° C.) | −6 | −15 | 0 | −30 | 15 | 55 | 95 | 25 |
| | | Particle size (50% particle size) | (nm) | 132 | 60 | 60 | 140 | 138 | 144 | 161 | 140 |
| | | Toluene insoluble matter | (%) | 96% | 95% | 95% | 96% | 96% | 96% | 95% | 96% |
| | | Degree of swelling with electrolyte solution | (times) | 2.50 | 2.60 | 2.55 | 2.60 | 2.60 | 2.40 | 2.10 | 2.50 |

Note that Tg values of starting polymers 1A to 8A described in Table 2 were all rough estimations by the FOX formula.
(Note) Names of starting materials in Table 2
MMA: methyl methacrylate
BA: n-butyl acrylate
EHA: 2-ethylhexyl acrylate
MAA: methacrylate
AA: acrylic acid
HEMA: 2-hydroxyethyl methacrylate
AM: acrylamide
GMA: glycidyl methacrylate
NaSS: sodium p-styrenesulfonate
A-TMPT: trimethylolpropane triacrylate (manufactured by Shin-Nakamura Chemical Co., Ltd.)
KH1025: Aqualon KH1025 (registered trade mark, manufactured by Daiichi Kogyo Seiyaku Co., Ltd.)
SR1025: Adekaria soap SR1025 (registered trade mark, manufactured by ADEKA CORP.)
APS: ammonium persulfate Example 1A Starting polymer 8A described in Table 2 (2.4 parts by mass on a solid basis) and starting polymer 1A (0.6 parts by mass on a solid basis) were weighed and dispersed in water (92.5 parts by mass) to prepare a thermoplastic polymer-containing coating liquid. Subsequently, the coating liquid was applied by use of a spray on one of the surfaces of polyolefin microporous film 1 described in Table 1, dried at 60° C. to remove water of the coating liquid. Similarly, the coating liquid was applied to the other surface and dried again to obtain a separator for an electricity storage device having a thermoplastic polymer on both surfaces of the polyolefin microporous film. The obtained separator was evaluated by the above methods. The obtained results are shown in Table 3.

Examples 2A to 40A, Comparative Examples 1A to 4A

Separators for an electricity storage device each were fabricated in the same manner as in Example 1A except that a coating liquid containing thermoplastic polymers in combination as shown in Tables 3 to 6 was applied to both surfaces of a polyolefin microporous film by any one of methods (spray, gravure). The physical properties and evaluation results of the obtained separators are shown in Tables 3 to 6. Note that Tg values of the thermoplastic polymers shown in Tables 3 to 6 were values measured by the method described in Section (8) in the above.

TABLE 3

| | | | | Example 1A | Example 2A | Example 3A | Example 4A | Example 5A | Example 6A | Example 7A |
|---|---|---|---|---|---|---|---|---|---|---|
| Polyolefin microporous film | | | | 1A | 1A | 1A | 1A | 1A | 1A | 1A |
| Thermoplastic polymer-containing coating liquid | Composition | Starting polymer No. | | 8A | 8A | 6A | 6A | 6A | 7A | 7A |
| | | Mixing ratio | % | 80 | 50 | 50 | 80 | 80 | 50 | 80 |
| | | Starting polymer No. | | 1A | 1A | 2A | 2A | 3A | 2A | 2A |
| | | Mixing ratio | % | 20 | 50 | 50 | 20 | 20 | 50 | 20 |
| | | Concentration of thermoplastic polymer | % | 3 | 3 | 3 | 3 | 3 | 3 | 3 |
| Coating method | | | | Spray | Spray | Spray | Spray | Spray | Spray | Spray |
| Existence form of thermoplastic polymer (coated form) | | | | Dots | Dots | Dots | Dots | Dots | Dots | Dots |
| Average particle size of particulate thermoplastic polymer (μm) | | | | 0.15 | 0.15 | 0.15 | 0.15 | 0.15 | 0.15 | 0.15 |
| Glass-transition temperature of thermoplastic polymer | | | ° C. | 35 5 | 35 5 | 64 −5 | 64 −5 | 64 10 | 105 −5 | 105 −5 |
| Area ratio of polyolefin microporous film covered with thermoplastic polymer coating layer | | | % | 30 | 30 | 30 | 30 | 30 | 30 | 30 |
| Area ratio of particulate thermoplastic polymer | | | % | 90 | 50 | 50 | 90 | 90 | 50 | 90 |
| Coating thickness | | | μm | 0.3 | 0.3 | 0.3 | 0.3 | 0.3 | 0.3 | 0.3 |
| Wettability | | | | ◯ | ◯ | ◯ | ◯ | ◯ | ◯ | ◯ |
| Adhesiveness to substrate | | | | ◯ | ◯ | ◯ | ◯ | ◯ | ◯ | ◯ |
| Stickiness | Peel strength | 25° C. | | ◎ | ◯ | ◎ | ◎ | ◎ | ◎ | ◎ |
| | | 40° C. | | ◯ | Δ | ◎ | ◎ | ◎ | ◎ | ◎ |
| Heat-peel strength | | 80° C. | | ◯ | ◯ | ◯ | ◯ | ◯ | ◯ | ◯ |
| Adhesiveness (relative to electrode) | | | | ◯ | ◯ | ◯ | ◯ | ◯ | ◯ | ◯ |
| Winding properties | | | | ◯ | ◯ | ◯ | ◯ | ◯ | ◯ | ◯ |
| Cycle characteristics | | | | ◯ | ◯ | ◎ | ◎ | ◎ | ◎ | ◎ |
| | | | | Example 8A | Example 9A | Example 10A | Example 11A | Example 12A | Example 13A | Example 14A |
| Polyolefin microporous film | | | | 1A | 1A | 1A | 1A | 1A | 1A | 1A |
| Thermoplastic polymer-containing coating liquid | Composition | Starting polymer No. | | 6A | 6A | 8A | 6A | 6A | 10A | 11A |
| | | Mixing ratio | % | 80 | 80 | 20 | 80 | 80 | 80 | 80 |
| | | Starting polymer No. | | 3A | 3A | 2A | 3A | 4A | 9A | 9A |
| | | Mixing ratio | % | 20 | 20 | 80 | 20 | 20 | 20 | 20 |
| | | Concentration of thermoplastic polymer | % | 3 | 10 | 3 | 30 | 3 | 30 | 30 |

TABLE 3-continued

|  |  |  |  |  |  |  |  |  |
|---|---|---|---|---|---|---|---|---|
| Coating method |  |  | Spray | Spray | Spray | Spray | Spray | Gravure | Gravure |
| Existence form of thermoplastic polymer (coated form) |  |  | Dots | Dots | Dots | Dots | Dots | Dots | Dots |
| Average particle size of particulate thermoplastic polymer (μm) |  |  | 0.15 | 0.15 | 0.15 | 0.15 | 0.15 | 0.35 | 0.35 |
| Glass-transition temperature of thermoplastic polymer | ° C. |  | 64 10 | 64 10 | 35 −5 | 64 10 | 64 −20 | 40 10 | 100 10 |
| Area ratio of polyolefin microporous film covered with thermoplastic polymer coating layer | % |  | 40 | 15 | 30 | 5 | 30 | 30 | 30 |
| Area ratio of particulate thermoplastic polymer | % |  | 90 | 90 | 20 | 90 | 90 | 90 | 90 |
| Coating thickness | μm |  | 0.5 | 1.0 | 0.3 | 2.5 | 0.3 | 1.0 | 1.0 |
| Wettability |  |  | ○ | ○ | ○ | ○ | ○ | ○ | ○ |
| Adhesiveness to substrate |  |  | ○ | ○ | ○ | ○ | ○ | ○ | ○ |
| Stickiness | Peel strength | 25° C. | ◎ | ◎ | Δ | ○ | ◎ | ○ | ◎ |
|  |  | 40° C. | ◎ | ◎ | X | Δ | ◎ | Δ | ◎ |
| Heat-peel strength |  | 80° C. | ○ | ○ | ○ | ○ | ○ | ○ | ○ |
| Adhesiveness (relative to electrode) |  |  | ○ | Δ | Δ | X | ○ | ○ | ○ |
| Winding properties |  |  | ○ | ○ | Δ | ○ | ○ | ○ | ○ |
| Cycle characteristics |  |  | ◎ | ○ | ○ | ○ | ◎ | ○ | ○ |

TABLE 4

|  |  |  |  | Example 15A | Example 16A | Example 17A | Example 18A | Example 19A | Example 20A | Example 21A |
|---|---|---|---|---|---|---|---|---|---|---|
| Polyolefin microporous film |  |  |  | 1A | 1A | 1A | 1A | 1A | 1A | 1A |
| Thermoplastic polymer-containing coating liquid | Composition | Starting polymer No. |  | 11A | 12A | 12A | 12A | 12A | 13A | 14A |
|  |  | Mixing ratio | % | 80 | 80 | 80 | 80 | 80 | 80 | 80 |
|  |  | Starting polymer No. |  | 1A | 1A | 1A | 1A | 1A | 1A | 1A |
|  |  | Mixing ratio | % | 20 | 20 | 20 | 20 | 20 | 20 | 20 |
|  | Concentration of thermoplastic polymer |  | % | 30 | 30 | 30 | 30 | 3 | 30 | 30 |
| Coating method |  |  |  | Gravure | Gravure | Gravure | Gravure | Spray | Gravure | Gravure |
| Existence form of thermoplastic polymer (coated form) |  |  |  | Dots | Dots | Dots | Dots | Dots | Dots | Dots |
| Average particle size of particulate thermoplastic polymer (μm) |  |  |  | 0.35 | 0.38 | 0.38 | 0.38 | 0.38 | 0.05 | 0.05 |
| Glass-transition temperature of thermoplastic polymer |  | ° C. |  | 100 5 | 100 5 | 100 5 | 100 5 | 100 5 | 100 5 | 40 5 |
| Area ratio of polyolefin microporous film covered with thermoplastic polymer coating layer |  | % |  | 30 | 30 | 10 | 50 | 30 | 30 | 30 |
| Area ratio of particulate thermoplastic polymer |  | % |  | 90 | 90 | 90 | 90 | 90 | 90 | 90 |
| Coating thickness |  | μm |  | 1.0 | 1.0 | 1.0 | 1.0 | 0.5 | 1.0 | 1.0 |
| Wettability |  |  |  | ○ | ○ | ○ | ○ | ○ | ○ | ○ |
| Adhesiveness to substrate |  |  |  | ○ | ○ | ○ | ○ | ○ | ○ | ○ |
| Stickiness | Peel strength | 25° C. |  | ◎ | ◎ | ◎ | ◎ | ◎ | ◎ | ○ |
|  |  | 40° C. |  | ◎ | ◎ | ◎ | ◎ | ◎ | ◎ | ○ |
| Heat-peel strength |  | 80° C. |  | ○ | ○ | ○ | ○ | ○ | ○ | ○ |
| Adhesiveness (relative to electrode) |  |  |  | ○ | ○ | Δ | ○ | ○ | ○ | ○ |
| Winding properties |  |  |  | ○ | ○ | ○ | ○ | ○ | ○ | ○ |
| Cycle characteristics |  |  |  | ○ | ○ | ◎ | ○ | ○ | ○ | ○ |

|  |  |  |  | Example 22A | Example 23A | Example 24A | Example 25A | Example 26A | Example 27A | Example 28A |
|---|---|---|---|---|---|---|---|---|---|---|
| Polyolefin microporous film |  |  |  | 1A | 1A | 1A | 1A | 1A | 1A | 1A |
| Thermoplastic polymer-containing coating liquid | Composition | Starting polymer No. |  | 6A | 6A | 12A | 15A | 16A | 17A | 18A |
|  |  | Mixing ratio | % | 80 | 80 | 90 | 90 | 90 | 90 | 80 |
|  |  | Starting polymer No. |  | 1A | 1A | 1A | 1A | 1A | 1A | 1A |
|  |  | Mixing ratio | % | 20 | 20 | 10 | 10 | 10 | 10 | 20 |
|  | Concentration of thermoplastic polymer |  | % | 30 | 30 | 30 | 30 | 30 | 30 | 30 |
| Coating method |  |  |  | Gravure | Gravure | Gravure | Gravure | Gravure | Gravure | Gravure |
| Existence form of thermoplastic polymer (coated form) |  |  |  | Dots | grid | Dots | Dots | Dots | Dots | Dots |
| Average particle size of particulate thermoplastic polymer (μm) |  |  |  | 0.15 | 0.15 | 0.38 | 0.5 | 0.5 | 1 | 0.35 |
| Glass-transition temperature of thermoplastic polymer |  | ° C. |  | 64 5 | 64 5 | 100 5 | 40 5 | 100 5 | 100 5 | 50 5 −20 |
| Area ratio of polyolefin microporous film covered with thermoplastic polymer coating layer |  | % |  | 30 | 50 | 30 | 30 | 30 | 30 | 30 |
| Area ratio of particulate thermoplastic polymer |  | % |  | 90 | 90 | 90 | 90 | 90 | 90 | 90 |

TABLE 4-continued

|  |  |  |  |  |  |  |  |  |
|---|---|---|---|---|---|---|---|---|
| Coating thickness | | μm | 1.0 | 2.0 | 1.0 | 1.0 | 1.0 | 2.0 | 1.0 |
| Wettability | | | ○ | ○ | ○ | ○ | ○ | ○ | ○ |
| Adhesiveness to substrate | | | ○ | ○ | ○ | ○ | ○ | ○ | ○ |
| Stickiness | Peel | 25° C. | ◎ | ◎ | ◎ | ○ | ◎ | ◎ | ◎ |
| | strength | 40° C. | ◎ | ◎ | ◎ | ○ | ◎ | ◎ | ○ |
| Heat-peel strength | | 80° C. | ○ | ○ | ○ | X | X | X | ○ |
| Adhesiveness (relative to electrode) | | | ○ | ○ | ○ | Δ | Δ | Δ | ○ |
| Winding properties | | | ○ | ○ | ○ | ○ | ○ | ○ | ○ |
| Cycle characteristics | | | ○ | ○ | ○ | ○ | ○ | ○ | ○ |

TABLE 5

|  |  |  | Example 29A | Example 30A | Example 31A | Example 32A | Example 33A | Example 34A |
|---|---|---|---|---|---|---|---|---|
| Polyolefin microporous film | | | 2A | 3A | 4A | 5A | 6A | 7A |
| Thermoplastic polymer-containing coating liquid | Composition | Starting polymer No. | 6A | 6A | 6A | 6A | 6A | 6A |
| | | Mixing ratio % | 80 | 80 | 80 | 80 | 80 | 80 |
| | | Starting polymer No. | 1A | 1A | 1A | 1A | 1A | 1A |
| | | Mixing ratio % | 20 | 20 | 20 | 20 | 20 | 20 |
| | Concentration of thermoplastic polymer | % | 30 | 30 | 30 | 30 | 30 | 30 |
| Coating method | | | Gravure | Gravure | Gravure | Gravure | Gravure | Gravure |
| Existence form of thermoplastic polymer (coated form) | | | Dots | Dots | Dots | Dots | Dots | Dots |
| Average particle size of particulate thermoplastic polymer (μm) | | | 0.15 | 0.15 | 0.15 | 0.15 | 0.15 | 0.15 |
| Glass-transition temperature of thermoplastic polymer | | ° C. | 64 5 | 64 5 | 64 5 | 64 5 | 64 5 | 64 5 |
| Area ratio of polyolefin microporous film covered with thermoplastic polymer coating layer | | % | 30 | 30 | 30 | 30 | 30 | 30 |
| Area ratio of particulate thermoplastic polymer | | % | 90 | 90 | 90 | 90 | 90 | 90 |
| Coating thickness | | μm | 2.0 | 2.0 | 2.0 | 2.0 | 2.0 | 2.0 |
| Wettability | | | ○ | ○ | ○ | ○ | ○ | ○ |
| Adhesiveness to substrate | | | ○ | ○ | ○ | ○ | ○ | ○ |
| Stickiness | Peel | 25° C. | ◎ | ◎ | ◎ | ◎ | ◎ | ◎ |
| | strength | 40° C. | ◎ | ◎ | ◎ | ◎ | ◎ | ◎ |
| Heat-peel strength | | 80° C. | ○ | ○ | ○ | ○ | ○ | ○ |
| Adhesiveness (relative to electrode) | | | ○ | ○ | ○ | ○ | ○ | ○ |
| Winding properties | | | ○ | ○ | ○ | ○ | ○ | ○ |
| Cycle characteristics | | | ◎ | ◎ | ○ | ◎ | ○ | ○ |

|  |  |  | Example 35A | Example 36A | Example 37A | Example 38A | Example 39A | Example 40A |
|---|---|---|---|---|---|---|---|---|
| Polyolefin microporous film | | | 7A | 8A | 9A | 10A | 11A | 12A |
| Thermoplastic polymer-containing coating liquid | Composition | Starting polymer No. | 6A | 6A | 6A | 6A | 6A | 6A |
| | | Mixing ratio % | 80 | 80 | 80 | 80 | 80 | 80 |
| | | Starting polymer No. | 1A | 1A | 1A | 1A | 1A | 1A |
| | | Mixing ratio % | 20 | 20 | 20 | 20 | 20 | 20 |
| | Concentration of thermoplastic polymer | % | 5 | 30 | 30 | 30 | 30 | 30 |
| Coating method | | | Spray | Gravure | Gravure | Gravure | Gravure | Gravure |
| Existence form of thermoplastic polymer (coated form) | | | Dots | Dots | Dots | Dots | Dots | Dots |
| Average particle size of particulate thermoplastic polymer (μm) | | | 0.15 | 0.15 | 0.15 | 0.15 | 0.15 | 0.15 |
| Glass-transition temperature of thermoplastic polymer | | ° C. | 64 5 | 64 5 | 64 5 | 64 5 | 64 5 | 64 5 |
| Area ratio of polyolefin microporous film covered with thermoplastic polymer coating layer | | % | 30 | 30 | 30 | 30 | 30 | 30 |
| Area ratio of particulate thermoplastic polymer | | % | 90 | 90 | 90 | 90 | 90 | 90 |
| Coating thickness | | μm | 0.5 | 2.0 | 2.0 | 2.0 | 2.0 | 1.0 |
| Wettability | | | ○ | ○ | ○ | ○ | ○ | ○ |
| Adhesiveness to substrate | | | ○ | ○ | ○ | ○ | ○ | ○ |
| Stickiness | Peel | 25° C. | ◎ | ◎ | ◎ | ◎ | ◎ | ◎ |
| | strength | 40° C. | ◎ | ◎ | ◎ | ◎ | ◎ | ◎ |
| Heat-peel strength | | 80° C. | ○ | ○ | ○ | ○ | ○ | ○ |
| Adhesiveness (relative to electrode) | | | ○ | ○ | ○ | ○ | ○ | ○ |
| Winding properties | | | ○ | ○ | ○ | ○ | ○ | ○ |
| Cycle characteristics | | | ○ | ○ | ◎ | ◎ | ◎ | ◎ |

TABLE 6

|  |  |  |  | Comparative Example 1A | Comparative Example 2A | Comparative Example 3A | Comparative Example 4A |
|---|---|---|---|---|---|---|---|
| Polyolefin microporous film |  |  |  | 1A | 1A | 1A | 1A |
| Thermoplastic polymer-containing coating liquid | Composition | Starting polymer No. |  | 6A | 1A | 5A | 6A |
|  |  | Mixing ratio | % | 100 | 100 | 100 | 80 |
|  |  | Starting polymer No. |  | — | — | — | 1A |
|  |  | Mixing ratio | % | 0 | 0 | 0 | 20 |
|  | Concentration of thermoplastic polymer |  | % | 3 | 3 | 3 | 30 |
| Coating method |  |  |  | Spray | Spray | Spray | Gravure |
| Existence form of thermoplastic polymer (coated form) |  |  |  | Dots | Dots | Dots | wholly coated |
| Average particle size of particulate thermoplastic polymer (μm) |  |  |  | 0.15 | — | — | 0.15 |
| Glass-transition temperature of thermoplastic polymer |  |  | ° C. | 64 | 5 | 26 | 64 |
| Area ratio of polyolefin microporous film covered with thermoplastic polymer coating layer |  |  | % | — | — | — | 5 |
|  |  |  |  | 30 | 30 | 30 | 100 |
| Area ratio of particulate thermoplastic polymer |  |  | % | 100 | 0 | 0 | 90 |
| Coating thickness |  |  | μm | — | 0.3 | 0.3 | 1.0 |
| Wettability |  |  |  | X | ○ | ○ | ○ |
| Adhesiveness to substrate |  |  |  | X | ○ | ○ | ○ |
| Stickiness |  | Peel strength | 25° C. | — | X | ○ | ◎ |
|  |  |  | 40° C. | — | X | X | ◎ |
| Heat-peel strength |  |  | 80° C. | — | ○ | ○ | ○ |
| Adhesiveness (relative to electrode) |  |  |  | — | Δ | ○ | ◎ |
| Winding properties |  |  |  | — | X | ○ | ○ |
| Cycle characteristics |  |  |  | — | ○ | ○ | X |

Note that in the separator for the electricity storage device described each in Examples A, the resin constituting a thermoplastic polymer coating layer has glass-transition temperatures in the ranges of 20° C. or more and less than 20° C. and a feature in that the peel strength was small in the press conditions at 25° C. and large in press conditions at 80° C. From this, it was presumed that, in the thermoplastic polymer coating layer, a large amount of thermoplastic resin having a glass-transition temperature of 20° C. or more was present on the side of the outermost surface of a separator for an electricity storage device; whereas a large amount of thermoplastic resin having a glass-transition temperature of less than 20° C. was present on the side of the interface between a polyolefin microporous film and a thermoplastic polymer coating layer.

Example B

Production Example 1-1B

High-density polyethylene 1 (14.25 parts by mass) having a viscosity average molecular weight of 250,000 and a melting point of 137° C., high-density polyethylene 2 (14.25 parts by mass) having a viscosity average molecular weight of 700,000 and a melting point of 137° C., a polypropylene (1.5 parts by mass) having a viscosity average molecular weight of 400,000 and a melting point of 163° C. and tetrakis-[methylene-(3',5'-di-t-butyl-4'-hydroxyphenyl)propionate]methane (0.2 parts by mass) serving as an antioxidant were blended to prepare a starting material.

Individual compositions each were loaded via a feeder of a double screw extruder having an aperture of 25 mm L/D=48. Furthermore, liquid paraffin (68 parts by mass) was injected by a side feed to each extruder. The composition was kneaded in the conditions of 200° C. and 200 rpm while controlling such that an extrusion amount per hour was 16 kg, and thereafter extruded from the T-die at 200° C. Immediately after the extrusion, the extruded material was cooled to solidify by a cast roll conditioned at 40° C. and molded into a sheet having a desired thickness. The sheet was stretched by a simultaneous biaxial stretching machine at a stretching ratio of 7×6.4 times at a temperature of 112° C. and soaked in methylene chloride. Then, liquid paraffin was removed by extraction, and thereafter dried and stretched by a tenter stretching machine in the transverse direction. Thereafter, the stretched sheet was relaxed in the width direction and subjected to a heat treatment to obtain polyolefin microporous film 1B. The physical properties of the obtained microporous film are shown in Table 7.

Production Examples 1-2B to 1-8B

Polyolefin microporous films 2B to 8B each were obtained by changing the relaxation rate of the stretched sheet in the width direction in the same manner as in Production Example 1-1B. The physical properties of the obtained microporous films are shown in Table 7.

Production Examples 2-9B to 2-13B

Polyolefin microporous films 9B to 13B were obtained in the same manner as in Production Examples 1-7A to 1-11A. The physical properties of the obtained microporous films are shown in Table 7.

TABLE 7

| | Polyolefin microporous film | | | | | | | | | | | | |
|---|---|---|---|---|---|---|---|---|---|---|---|---|---|
| | 1B | 2B | 3B | 4B | 5B | 6B | 7B | 8B | 9B | 10B | 11B | 12B | 13B |
| Relaxation rate in width direction (%) | 24 | 14 | 13 | 23 | 13 | 11 | 11 | 10 | Boehmite (2 μm) was | Boehmite (4 μm) was | Boehmite (3 μm) was | Boehmite (7 μm) was | Fired kaolin |

TABLE 7-continued

| | Polyolefin microporous film | | | | | | | | | | | | |
|---|---|---|---|---|---|---|---|---|---|---|---|---|---|
| | 1B | 2B | 3B | 4B | 5B | 6B | 7B | 8B | 9B | 10B | 11B | 12B | 13B |
| Weight per unit area (g/m²) | 7.4 | 5.3 | 7.0 | 8.5 | 9.4 | 6.4 | 6.4 | 8.4 | applied to a polyolefin microporous film 1B | applied to a polyolefin microporous film 1B | applied to a polyolefin microporous film 2B | applied to a polyolefin microporous film 5B | (6 µm) was applied to a polyolefin microporous film 3B |
| Film thickness (µm) | 12 | 9 | 12 | 14 | 16 | 15 | 18 | 18 | | | | | |
| Coating-layer thickness (µm) | — | — | — | — | — | — | — | — | | | | | |
| Porosity (%) | 36 | 37 | 40 | 36 | 39 | 59 | 62 | 51 | | | | | |
| Air permeability (s/100 cc) | 230 | 159 | 150 | 292 | 168 | 75 | 89 | 90 | | | | | |
| Puncture strength (g) | 400 | 310 | 320 | 501 | 386 | 440 | 440 | 400 | | | | | |
| Handling performance | ○ | ○ | ○ | ○ | ○ | ○ | ○ | ○ | ○ | ○ | ○ | ○ | ○ |
| Adhesiveness to electrode active material | X | X | X | X | X | X | X | X | X | X | X | X | X |
| Rate characteristics | 99 | 99.5 | 99 | 99 | 99 | 99.5 | 99.5 | 99 | 99 | 99 | 99 | 99.5 | 99 |

Production Example 2-1B (Production of Acrylic Emulsion Coating Liquid

In a reaction container equipped with a stirrer, a reflux condenser, a driptank and a thermometer, ion exchange water (70.4 parts), "Aqualon KH1025" (registered trade mark, a 25% aqueous solution, manufactured by Daiichi Kogyo Seiyaku Co., Ltd.) (0.5 parts) and "Adekaria soap SR1025" (registered trade mark, a 25% aqueous solution, manufactured by ADEKA CORP.) (0.5 parts) were supplied. The interior temperature of the reaction container was raised to 80° C. While maintaining the temperature at 80° C., ammonium persulfate (an aqueous 2% solution) (7.5 parts) was added.

Five minutes after the aqueous ammonium persulfate (APS) solution was added, an emulsion, which was prepared by mixing a mixture of methyl methacrylate (MMA) (38.9 parts), n-butyl acrylate (BA) (26.5 parts), 2-ethylhexyl acrylate (EHA) (27 parts), methacrylic acid (MAA) (0.1 part), acrylic acid (AA) (0.1 part), 2-hydroxyethyl methacrylate (HEMA) (2 parts), acrylamide (AM) (5 parts), glycidyl methacrylate (GMA) (0.4 parts), trimethylolpropane triacrylate (A-TMPT, manufactured by Shin-Nakamura Chemical Co., Ltd.) (2 parts), "Aqualon KH1025" (registered trade mark, a 25% aqueous solution, manufactured by Daiichi Kogyo Seiyaku Co., Ltd.) (3 parts), "Adekaria soap SR1025" (registered trade mark, a 25% aqueous solution, manufactured by ADEKA CORP.) (3 parts), sodium p-styrenesulfonate (NaSS) (0.05 parts), ammonium persulfate (a 2% aqueous solution) (7.5 parts), γ-methacryloxypropyltrimethoxysilane (0.3 parts) and ion exchange water (52 parts), by a homo mixer for 5 minutes, was added dropwise from a driptank to the reaction container over 150 minutes.

After completion of dropwise addition of the emulsion, the interior temperature of the reaction container was maintained at 80° C. for 90 minutes and thereafter reduced to room temperature. The obtained emulsion was adjusted to pH=9.0 with an aqueous ammonium hydroxide solution (an aqueous 25% solution) to obtain thermoplastic polymer-containing coating liquid 1B.

Production Examples 2-2B to 2-10B

Thermoplastic polymer-containing coating liquids 2B to 10B were obtained in the same manner as in Production Example 1-1B except that compositions of monomers and the other starting materials used were changed as shown in Table 8.

TABLE 8

| Content | Type | Name of starting material | Active ingredient | Coating liquid | | | | | | | | | |
|---|---|---|---|---|---|---|---|---|---|---|---|---|---|
| | | | | 1B | 2B | 3B | 4B | 5B | 6B | 7B | 8B | 9B | 10B |
| Initial supply | Emulsifying agent | KH1025 | 25% | 0.5 | 0.5 | 0.5 | 0.5 | 0.5 | 0.5 | 0.5 | 0.5 | 0.5 | 0.5 |
| | | SR1025 | 25% | 0.5 | 0.5 | 0.5 | 0.5 | 0.5 | 0.5 | 0.5 | 0.5 | 0.5 | 0.5 |
| | Ion exchange water | | — | 70.4 | 70.4 | 70.4 | 70.4 | 70.4 | 70.4 | 70.4 | 70.4 | 70.4 | 70.4 |
| | Initiator | APS (aq) | 2% | 7.5 | 7.5 | 7.5 | 7.5 | 7.5 | 7.5 | 7.5 | 7.5 | 7.5 | 7.5 |
| Emulsion | Monomer | MMA | 100% | 38.9 | 38.9 | 63.4 | 63.4 | 44.9 | 55.4 | 46.4 | 32.9 | 77.4 | 38.9 |
| | | BA | 100% | 26.5 | 26.5 | 14 | 14 | 19.5 | 18 | 22.5 | 29.5 | 7 | 26.5 |
| | | EHA | 100% | 27 | 27 | 15 | 15 | 20 | 19 | 23.5 | 30 | 8 | 27 |
| | Functional group containing monomer | MAA | 100% | 0.1 | 0.1 | 0.1 | 0.1 | 0.1 | 0.1 | 0.1 | 0.1 | 0.1 | 0.1 |
| | | AA | 100% | 0.1 | 0.1 | 0.1 | 0.1 | 0.1 | 0.1 | 0.1 | 0.1 | 0.1 | 0.1 |
| | | HEMA | 100% | 2 | 2 | 2 | 2 | 10 | 2 | 2 | 2 | 2 | 2 |
| | | AM | 100% | 5 | 5 | 5 | 5 | 5 | 5 | 5 | 5 | 5 | 5 |
| | | GMA | 100% | 0.4 | 0.4 | 0.4 | 0.4 | 0.4 | 0.4 | 0.4 | 0.4 | 0.4 | 0.4 |
| | Emulsifying agent | KH1025 | 25% | 3 | 3 | 3 | 3 | 3 | 3 | 3 | 3 | 3 | 3 |
| | | SR1025 | 25% | 3 | 3 | 3 | 3 | 3 | 3 | 3 | 3 | 3 | 3 |
| | | NaSS | 100% | 0.05 | 0.05 | 0.05 | 0.05 | 0.05 | 0.05 | 0.05 | 0.05 | 0.05 | 0.05 |

TABLE 8-continued

| Content | Type | Name of starting material | Active ingredient | Coating liquid 1B | 2B | 3B | 4B | 5B | 6B | 7B | 8B | 9B | 10B |
|---|---|---|---|---|---|---|---|---|---|---|---|---|---|
| | Crosslinking agent | A-TMPT | 100% | 2 | 0.4 | 2 | 0.4 | 0.4 | 0.4 | 4 | 4 | 0.4 | 0.1 |
| | | γ-methacryl-oxypropyl-trimethoxysilane | 100% | 0.3 | 0.3 | 0.3 | 0.3 | 0.3 | 0.3 | 0.3 | 0.3 | 0.3 | 0.1 |
| | Initiator | APS (aq) | 2% | 7.5 | 7.5 | 7.5 | 7.5 | 7.5 | 7.5 | 7.5 | 7.5 | 7.5 | 7.5 |
| | Ion exchange water | | — | 52 | 52 | 52 | 52 | 52 | 52 | 52 | 52 | 52 | 52 |
| Physical property of latex | Glass-transition temperature Tg | | (° C.) | −6 | −6 | 35 | 35 | 15 | 20 | 5 | −15 | 55 | −6 |
| | Particle size (50% particle size) | | (nm) | 142 | 141 | 135 | 135 | 139 | 139 | 140 | 148 | 131 | 142 |
| | Toluene insoluble matter | | (%) | 97 | 95 | 97 | 96 | 96 | 96 | 99 | 99 | 96 | 88 |
| | Degree of swelling with electrolyte solution | | (times) | 1.5 | 3.8 | 1.6 | 3.0 | 3.4 | 3.6 | 0.9 | 1.0 | 3.3 | 5.5 |

\* Note that Tg values of thermoplastic polymers described in Table 8 were all rough estimations by the FOX formula.

(Note) Names of starting materials in Table 8
MMA: methyl methacrylate
BA: n-butyl acrylate
EHA: 2-ethylhexyl acrylate
MAA: methacrylate
AA: acrylic acid
HEMA: 2-hydroxyethyl methacrylate
AM: acrylamide
GMA: glycidyl methacrylate
NaSS: sodium p-styrenesulfonate
A-TMPT: trimethylolpropane triacrylate (manufactured by Shin-Nakamura Chemical Co., Ltd.)
KH1025: Aqualon KH1025 (registered trade mark, manufactured by Daiichi Kogyo Seiyaku Co., Ltd.)
SR1025: Adekaria soap SR1025 (registered trade mark, manufactured by ADEKA CORP.)
APS: ammonium persulfate Example 1B Thermoplastic polymer-containing coating liquid 1B (7.5 parts by mass) was uniformly dispersed in water (92.5 parts by mass) to prepare a coating liquid. The coating liquid was applied to a surface of polyolefin microporous film 1B by use of a gravure coater and dried at 60° C. to remove water. Furthermore, the coating liquid was applied similarly to the other surface and dried to obtain a porous film (a separator for an electricity storage device). The physical properties and evaluation results of the obtained porous film are shown in Table 9.

Examples 2B to 8B

Porous films (separators for an electricity storage device) were prepared in the same manner as in Example 1A except that thermoplastic polymer-containing coating liquids 2B to 5B were used. The physical properties and evaluation results of the thermoplastic polymer-containing coating liquids used, polyolefin microporous films and the obtained porous films (separators for an electricity storage device) are shown in Table 9.

Example 9B

To polyolefin microporous film 1B, thermoplastic polymer-containing coating liquid 5B was applied by a spray and dried at 60° C. to remove water. Furthermore, thermoplastic polymer-containing coating liquid 5B was applied similarly to the other surface and dried to obtain a porous film (a separator for an electricity storage device). The physical properties and evaluation results of the obtained porous film (a separator for an electricity storage device) are shown in Table 9.

Example 10B

To polyolefin microporous film 1B, thermoplastic polymer-containing coating liquid 5B was applied by inkjet so as to obtain a resolution of 180 Dpi and dried at 60° C. to remove water. Furthermore, thermoplastic polymer-containing coating liquid 5B was applied similarly to the other surface and dried to obtain a porous film (a separator for an electricity storage device). The physical properties and evaluation results of the obtained porous film (a separator for an electricity storage device) are shown in Table 9.

Examples 11B to 13B

To polyolefin microporous film 1B, thermoplastic polymer-containing coating liquid 5B was applied by a gravure coater, which was processed to form dots, and dried at 60° C. to remove water. Furthermore, thermoplastic polymer-containing coating liquid 5B was applied similarly to the other surface and dried to obtain a porous film (a separator for an electricity storage device). The physical properties and evaluation results of the obtained porous films (separators for an electricity storage device) are shown in Table 9.

Examples 14B to 27B

Porous films (separators for an electricity storage device) were prepared in the same manner as in Example 9B except that polyolefin microporous films and thermoplastic polymer-containing coating liquids described in Tables 9 and 10 were used. The physical properties and evaluation results of the obtained porous films (separators for an electricity storage device) are shown in Tables 9 and 10.

Comparative Examples 1B to 3B

Porous films (separators for an electricity storage device) were prepared in the same manner as in Example 1B except that polyolefin microporous films and thermoplastic polymer-containing coating liquids described in Table 11 were used. The physical properties and evaluation results of the obtained porous films (separators for an electricity storage device) are shown in Table 11.

[Rate Characteristics]
(Fabrication of Electrode)
a. Fabrication of Positive Electrode Lithium cobalt composite oxide (LiCoO$_2$) (92.2 mass %) as a positive electrode active material, scale-like graphite and acetylene black (2.3 mass % for each) as a conductive material and polyvinylidene fluoride (PVDF) (3.2 mass %) as a binder were dispersed in N-methyl pyrrolidone (NMP) to prepare a slurry. The slurry was applied to one of the surfaces of an aluminum foil of 20 μm in thickness serving as a positive electrode collector by a die coater, dried at 130° C. for 3 minutes and thereafter subjected to compression molding by a roll pressing machine. The application herein was controlled such that the active material coating amount of positive electrode was 250 g/m$^2$ and the bulk density of the active material was 3.00 g/cm$^2$.

b. Fabrication of Negative Electrode

Artificial graphite (96.9 mass %) as a negative electrode active material, an ammonium salt of carboxymethylcellulose (1.4 mass %) and a styrene-butadiene copolymer latex (1.7 mass %) as a binder were dispersed in purified water to prepare a slurry. The slurry was applied to one of the surfaces of a copper foil of 12 μm in thickness serving as a negative electrode collector by a die coater, dried at 120° C. for 3 minutes and thereafter subjected to compression molding by a roll pressing machine. The application herein was controlled such that the coating amount of negative electrode active material was 106 g/m$^2$ and the bulk density of the active material was 1.35 g/cm$^3$.

(Fabrication of Battery)
a. Fabrication of Positive Electrode

The positive electrode fabricated in the same manner as in Section (Fabrication of electrode) a., was punched to obtain a circular electrode having an area of 2.00 cm$^2$.

b. Fabrication of Negative Electrode

The negative electrode fabricated in the same manner as in Section (Fabrication of electrode) b., was punched to obtain a circular electrode having an area of 2.05 cm$^2$.

c. Non-Aqueous Electrolyte

In a solvent mixture of ethylene carbonate:ethylmethyl carbonate=1:2 (volume ratio), LiPF6 as a solute was dissolved so as to have a concentration 1.0 ml/L to prepare a non-aqueous electrolyte.

d. Assemble of Battery

The porous film of Example 1B was used as a separator. A negative electrode, the porous film and a positive electrode were laminated in this order from the bottom such that the active material surface of the positive electrode faced to the active material surface of the negative electrode. The laminate was housed in a stainless steel metal container provided with a cover, which was insulated from a container main body, such that the copper foil of the negative electrode and the aluminum foil of the positive electrode were in contact with the container main body and the cover, respectively. Into the container, a non-aqueous electrolyte was injected and the container was sealed airtight to obtain a non-aqueous electrolyte secondary battery (Example 1B).

The simple battery assembled was charged at 25° C. at a current value of 3 mA (about 0.5 C) up to a battery voltage of 4.2 V and then the current value was allowed to decrease from 3 mA while maintaining a voltage at 4.2 V. In this manner, after the battery was fabricated, the initial charge of the battery and the following discharge at a current value of 3 mA up to a battery voltage of 3.0 V were performed in total for about 6 hours.

Subsequently, the battery was charged up to a battery voltage of 4.2 V at 25° C. at a current value of 6 mA (about 1.0 C) and then the current value was allowed to decrease from 6 mA while maintaining a voltage at 4.2 V. In this manner, the charge of the battery and the following discharge at a current value of 6 mA up to a battery voltage of 3.0 V were performed in total for about 3 hours. The discharge capacity at this time was specified as 1 C discharge capacity (mAh).

Subsequently, at 25° C., the battery was charged at a current value of 6 mA (about 1.0 C) up to a battery voltage of 4.2 V and the current value was allowed to decrease from 6 mA while maintaining a voltage at 4.2 V. In this manner, the charge of the battery and the following discharge at a current value of 12 mA (about 2.0 C) up to a battery voltage of 3.0 V were performed in total for about 3 hours. The discharge capacity at this time was specified as 2C discharge capacity (mAh).

The rate of 2C discharge capacity to 1 C discharge capacity was calculated and the value was specified as rate characteristics. The evaluation results are shown in Table 9.

Rate characteristics(%)=(2$C$ discharge capacity/1$C$ discharge capacity)×100

Examples 2B to 27B and Comparative Examples 1B to 3B (Battery)

Batteries (Examples 2B to 27B and Comparative Examples 1B to 3B) were fabricated in the same manner as in Example 1B except that porous films of Examples 2B to 27B and Comparative Examples 1B to 3B were used as the separators in place of the porous film of Example 1B. The rate characteristics of the obtained batteries were evaluated. The evaluation results are shown in Tables 9 to 11.

TABLE 9

|  |  | Example No. | | | | | | |
| --- | --- | --- | --- | --- | --- | --- | --- | --- |
|  |  | Example 1B | Example 2B | Example 3B | Example 4B | Example 5B | Example 6B | Example 7B |
| Thermoplastic polymer | Adhesive resin | 1B | 2B | 3B | 4B | 1B | 1B | 5B |
|  | Glass-transition temperature (° C.) | −6 | −6 | 35 | 35 | −6 | −6 | 15 |
|  | Degree of swelling (times) | 1.5 | 3.8 | 1.6 | 3 | 1.5 | 1.5 | 3.4 |
|  | Content of adhesive resin (g/m$^2$) | 0.1 | 0.1 | 0.1 | 0.1 | 1.3 | 0.05 | 0.2 |

TABLE 9-continued

|  |  | | | | | | | |
|---|---|---|---|---|---|---|---|---|
| | Surface coating ratio (%) | 60 | 60 | 60 | 60 | 75 | 60 | 5 |
| | Existence form of adhesive resin | Non-dots | Non-dots | Non-dots | Non-dots | Non-dots | Non-dots | Non-dots |
| | Average major axis (μm) | — | — | — | — | — | — | — |
| | Thickness (μm) | 0.3 | 0.2 | 0.3 | 0.2 | 0.2 | 0.2 | 0.1 |
| Porous film | Polyolefin microporous film | 1B | 1B | 1B | 1B | 1B | 1B | 1B |
| | Film thickness (μm) | 12.3 | 12.2 | 12.3 | 12.2 | 12.2 | 12.2 | 12.1 |
| | Air permeability (s/100 cc) | 430 | 420 | 440 | 420 | 520 | 330 | 300 |
| | Adhesiveness between thermoplastic polymer and polyolefin microporous film | ○ | ○ | ○ | ○ | ○ | ○ | ○ |
| | Handling performance | Δ | Δ | ○ | ○ | Δ | Δ | ○ |
| | Adhesiveness to electrode active material | ○ | ○ | ○ | ○ | ○ | X | X |
| Battery | Rate characteristics | 43.1 | 38.1 | 45.1 | 39.4 | 30.2 | 44.3 | 58.7 |

| | | Example No. | | | | | | |
|---|---|---|---|---|---|---|---|---|
| | | Example 8B | Example 9B | Example 10B | Example 11B | Example 12B | Example 13B | Example 14B |
| Thermoplastic polymer | Adhesive resin | 5B | 5B | 5B | 5B | 5B | 5B | 5B |
| | Glass-transition temperature (° C.) | 15 | 15 | 15 | 15 | 15 | 15 | 15 |
| | Degree of swelling (times) | 3.4 | 3.4 | 3.4 | 3.4 | 3.4 | 3.4 | 3.4 |
| | Content of adhesive resin (g/m$^2$) | 0.2 | 0.2 | 0.2 | 0.2 | 0.2 | 0.2 | 0.2 |
| | Surface coating ratio (%) | 60 | 30 | 30 | 30 | 30 | 30 | 30 |
| | Existence form of adhesive resin | Non-dots | Dots | Dots | Dots | Dots | Dots | Dots |
| | Average major axis (μm) | — | 50 | 30 | 100 | 500 | 1000 | 50 |
| | Thickness (μm) | 0.1 | 0.5 | 0.5 | 0.5 | 0.5 | 0.5 | 0.3 |
| Porous film | Polyolefin microporous film | 1B | 1B | 1B | 1B | 1B | 1B | 2B |
| | Film thickness (μm) | 12.1 | 12.5 | 12.5 | 12.5 | 12.5 | 12.5 | 9.3 |
| | Air permeability (s/100 cc) | 400 | 300 | 300 | 300 | 300 | 300 | 220 |
| | Adhesiveness between thermoplastic polymer and polyolefin microporous film | ○ | ○ | ○ | ○ | ○ | ○ | ○ |
| | Handling performance | ○ | ○ | ○ | ○ | ○ | ○ | ○ |
| | Adhesiveness to electrode active material | ○ | ○ | ○ | ○ | ○ | ○ | ○ |
| Battery | Rate characteristics | 40.2 | 53.5 | 53 | 52 | 53 | 53 | 74.2 |

TABLE 10

| | | Example No. | | | | | | |
|---|---|---|---|---|---|---|---|---|
| | | Example 15B | Example 16B | Example 17B | Example 18B | Example 19B | Example 20B | Example 21B |
| Thermoplastic polymer | Adhesive resin | 5B | 6B | 7B | 5B | 5B | 5B | 5B |
| | Glass-transition temperature (° C.) | 15 | 20 | 5 | 15 | 15 | 15 | 15 |
| | Degree of swelling (times) | 3.4 | 3.6 | 0.9 | 3.4 | 3.4 | 3.4 | 3.4 |
| | Content of adhesive resin (g/m$^2$) | 0.2 | 0.2 | 0.2 | 0.2 | 0.2 | 0.2 | 0.2 |
| | Surface coating ratio (%) | 30 | 30 | 30 | 30 | 30 | 30 | 30 |
| | Existence form of adhesive resin | Dots | Dots | Dots | Dots | Dots | Dots | Dots |
| | Average major axis (μm) | 50 | 50 | 50 | 50 | 50 | 50 | 50 |
| | Thickness (μm) | 0.5 | 0.5 | 0.5 | 0.5 | 0.5 | 3.3 | 0.3 |
| Porous film | Polyolefin microporous film | 3B | 3B | 3B | 4B | 5B | 6B | 7B |
| | Film thickness (μm) | 12.5 | 12.5 | 12.5 | 14.5 | 16.5 | 18.3 | 18.3 |
| | Air permeability (s/100 cc) | 200 | 200 | 200 | 355 | 220 | 150 | 160 |
| | Adhesiveness between thermoplastic polymer and polyolefin microporous film | ○ | ○ | ○ | ○ | ○ | ○ | ○ |
| | Handling performance | ○ | ○ | Δ | ○ | ○ | ○ | ○ |
| | Adhesiveness to electrode active material | ○ | ○ | ○ | ○ | ○ | ○ | ○ |
| Battery | Rate characteristics | 69.4 | 65.6 | 70.6 | 37.3 | 43.1 | 70.1 | 72.3 |

| | | Example No. | | | | | |
|---|---|---|---|---|---|---|---|
| | | Example 22B | Example 23B | Example 24B | Example 25B | Example 26B | Example 27B |
| Thermoplastic polymer | Adhesive resin | 5B | 5B | 5B | 5B | 5B | 5B |
| | Glass-transition temperature (° C.) | 15 | 15 | 15 | 15 | 15 | 15 |
| | Degree of swelling (times) | 3.4 | 3.4 | 3.4 | 3.4 | 3.4 | 3.4 |

TABLE 10-continued

|  |  |  |  |  |  |  |  |
|---|---|---|---|---|---|---|---|
|  | Content of adhesive resin (g/m²) | 0.2 | 0.2 | 0.2 | 0.2 | 0.2 | 0.2 |
|  | Surface coating ratio (%) | 30 | 30 | 30 | 30 | 30 | 30 |
|  | Existence form of adhesive resin | Dots | Dots | Dots | Dots | Dots | Dots |
|  | Average major axis (μm) | 50 | 50 | 50 | 50 | 50 | 50 |
|  | Thickness (μm) | 0.3 | 0.2 | 0.3 | 0.2 | 2.2 | 3.2 |
| Porous film | Polyolefin microporous film | 8B | 9B | 10B | 11B | 12B | 13B |
|  | Film thickness (μm) | 18.3 | 14.2 | 16.3 | 12.2 | 25.2 | 21.2 |
|  | Air permeability (s/100 cc) | 160 | 180 | 180 | 190 | 140 | 120 |
|  | Adhesiveness between thermoplastic polymer and polyolefin microporous film | ○ | ○ | ○ | ○ | ○ | ○ |
|  | Handling performance | ○ | ○ | ○ | ○ | ○ | ○ |
|  | Adhesiveness to electrode active material | ○ | ○ | ○ | ○ | ○ | ○ |
| Battery | Rate characteristics | 58.6 | 55.1 | 58.1 | 57.7 | 75.1 | 55.4 |

TABLE 11

|  |  | Comparative Example | | |
|---|---|---|---|---|
|  |  | Comparative Example 1B | Comparative Example 2B | Comparative Example 3B |
| Thermoplastic polymer | Adhesive resin | 8B | 9B | 10B |
|  | Glass-transition temperature (° C.) | −15 | 55 | −6 |
|  | Degree of swelling (times) | 1.5 | 3.8 | 5.5 |
|  | Content of adhesive resin (g/m²) | 0.1 | 0.1 | 0.1 |
|  | Surface coating ratio (%) | 60 | 60 | 60 |
|  | Existence form of adhesive resin | Non-dots | Non-dots | Non-dots |
|  | Average major axis (μm) | — | — | — |
|  | Thickness (μm) | 0.2 | 0 | 0.3 |
| Porous film | Polyolefin microporous film | 1B | 1B | 1B |
|  | Film thickness (μm) | 12.2 | — | 12.3 |
|  | Air permeability (s/100 cc) | 450 | — | 460 |
|  | Adhesiveness between thermoplastic polymer and polyolefin microporous film | ○ | X | ○ |
|  | Handling performance | X | — | Δ |
|  | Adhesiveness to electrode active material | ○ | — | ○ |
| Battery | Rate characteristics | 45.3 | — | 24.1 |

This application is based on the Japanese Patent Application No. 2012-166179 filed Jul. 26, 2012 with Japan Patent Office and Japanese Patent Application No. 2012-234852 filed Oct. 24, 2012 with Japan Patent Office, the contents of which are incorporated herein by reference.

INDUSTRIAL APPLICABILITY

According to the present invention, it is possible to provide a separator excellent in adhesiveness to electrodes as well as excellent in handling performance. Accordingly, the present invention is useful as a separator for electricity storage devices including batteries such as non-aqueous electrolyte secondary batteries, condensers and capacitors.

The invention claimed is:

1. A separator for an electricity storage device comprising a polyolefin microporous film and a thermoplastic polymer coating layer covering at least a part of at least one of surfaces of the polyolefin microporous film, wherein
the thermoplastic polymer coating layer, on the polyolefin microporous film, comprises a thermoplastic polymer in a sea-island configuration,
the thermoplastic polymer coating layer contains the thermoplastic polymer having at least two glass-transition temperatures,
at least one of the glass-transition temperatures is in a range of less than 20° C., and
at least one of the glass-transition temperatures is in a range of 20° C. or more.

2. The separator for the electricity storage device according to claim 1, wherein, in the thermoplastic polymer coating layer,
a thermoplastic resin having a glass-transition temperature of 20° C. or more is present on a side of a outermost surface of the separator for the electricity storage device, and
a thermoplastic resin having a glass-transition temperature of less than 20° C. is present on a side of a interface between the polyolefin microporous film and the thermoplastic polymer coating layer.

3. The separator for the electricity storage device according to claim 1, wherein a peel strength of an aluminum foil after the aluminum foil is pressed at a temperature of 25° C. and a pressure of 5 MPa for 3 minutes against the outermost surface of the separator for the electricity storage device having the thermoplastic polymer coating layer thereon is 8 gf/cm or less.

4. The separator for the electricity storage device according to claim 1, wherein a peel strength of an aluminum foil after the aluminum foil is pressed at a temperature of 80° C. and a pressure of 10 MPa for 3 minutes against the outermost surface of the separator for the electricity storage device having the thermoplastic polymer coating layer thereon is 10 gf/cm or more.

5. The separator for the electricity storage device according to claim 1, wherein a 90° peel strength of the polyolefin microporous film and the thermoplastic polymer coating layer is 6 gf/mm or more.

6. The separator for the electricity storage device according to claim 1, wherein, in the thermoplastic polymer coating layer, at least a part of the thermoplastic polymer present on the outermost surface of the separator for the electricity storage device is a particulate thermoplastic polymer.

7. The separator for the electricity storage device according to claim 6, wherein the particulate thermoplastic polymer has an average particle size of 0.01 μm to 0.4 μm.

8. The separator for the electricity storage device according to claim 1, wherein an area ratio of the polyolefin microporous film covered with the thermoplastic polymer coating layer is 95% or less based on 100% of a total area of the polyolefin microporous film.

9. The separator for the electricity storage device according to claim 1, wherein an area ratio of the polyolefin microporous film covered with the thermoplastic polymer coating layer is 50% or less based on 100% of the total area of the polyolefin microporous film.

10. A laminate formed by laminating the separator for the electricity storage device according to claim 1 and electrodes.

11. The separator for the electricity storage device according to claim 1, wherein the thermoplastic polymer coating layer has an average thickness of 1.5 μm or less.

12. The separator for the electricity storage device according to claim 1, wherein a content of the thermoplastic polymer in the thermoplastic polymer coating layer is 0.05 $g/m^2$ or more and 1.0 $g/m^2$ or less.

* * * * *